United States Patent [19]

Tsutsui et al.

[11] Patent Number: 5,733,198
[45] Date of Patent: Mar. 31, 1998

[54] THREAD CUTTING MACHINE AND THREAD CUTTING METHOD

[75] Inventors: Katsunori Tsutsui, Chita-gun; Masayuki Iwai, Nagoya, both of Japan

[73] Assignee: Brother Kogyo Kabushiki Kaisha, Aichi-Ken, Japan

[21] Appl. No.: 560,072

[22] Filed: Nov. 17, 1995

[30] Foreign Application Priority Data

Nov. 18, 1994 [JP] Japan .................. 6-285106
Nov. 18, 1994 [JP] Japan .................. 6-285107

[51] Int. Cl.$^6$ .................................. B21D 53/24
[52] U.S. Cl. .................. 470/96; 470/18; 470/44; 470/181; 470/198
[58] Field of Search .................. 470/18, 25, 44, 470/45, 46, 87, 96, 103, 105, 181, 198, 199; 408/8, 9, 10, 11, 12, 13

[56] References Cited

U.S. PATENT DOCUMENTS

| | | | |
|---|---|---|---|
| 4,745,557 | 5/1988 | Pekar et al. .................. | 408/8 |
| 4,780,654 | 10/1988 | Shoji et al. .................. | 408/8 |
| 4,813,821 | 3/1989 | Hirota .................. | 408/8 |
| 4,879,660 | 11/1989 | Asakura et al. . | |
| 4,911,588 | 3/1990 | Ikemota et al. .................. | 470/103 |
| 4,985,841 | 1/1991 | Iwagaya .................. | 408/9 |
| 5,062,744 | 11/1991 | Nakamura et al. .................. | 408/8 |
| 5,316,520 | 5/1994 | Green .................. | 470/96 |
| 5,352,069 | 10/1994 | Rourke .................. | 470/45 |

OTHER PUBLICATIONS

JP Provisional Publication No. SHO 60-155319 Published on Aug. 15, 1985. * English Abstract*.

JP Provisional Publication No. SHO 63-251121 Published on Oct. 18, 1988.

JP Provisional Publication No. SHO 64-58425 Published on Mar. 6, 1989.

*Primary Examiner*—Lowell A. Larson
*Assistant Examiner*—Ed Tolan
*Attorney, Agent, or Firm*—Kane,Dalsimer,Sullivan, Kurucz, Levy, Eisele and Richard, LLP

[57] ABSTRACT

Axial loads encountered during thread cutting are reduced by controlling interactions between rotation speed, axial feeding speed, feeding (threading) pitch, and feeding position. A counterload is generated by changing a feeding pitch to a corrected feeding pitch, which changes the rotation speed, while keeping the feeding speed constant; by changing the feeding speed, while compensating the rotation speed (which is derived from the feeding speed) to remain constant; by changing the rotation speed, while compensating the rotation speed deviation feedback (to allow the deviation correction to follow the rotation speed change), while keeping the feeding speed constant; by generating a function according to empirical results that controls the feeding pitch, and therefore the rotation speed, while keeping the feeding speed constant; and by combinations of these methods.

35 Claims, 15 Drawing Sheets

THREAD CUTTING MACHINE AND THREAD CUTTING METHOD

BACKGROUND OF THE INVENTION

This invention relates to a thread cutting machine, and more particularly to a thread cutting machine able to reduce loads during cutting.

Conventionally, a thread cutting machine taps a hole already formed in a workpiece using a tap. The thread cutting machine has a spindle head and spindle to which the tap is fixed, a driving mechanism for rotating the spindle, and a feeding mechanism for feeding the spindle head toward and away from the workpiece.

A conventional numerical control (NC) thread cutting machine can use a feed speed derived by simply dividing the spindle rotation speed by the tapping tool cutting pitch (the actual pitch of the threads on the tool), or a spindle rotation speed derived by multiplying the feed speed by the cutting pitch. In both cases, one master speed instruction is sent, and the remaining speed (slave) instruction is derived from the master speed instruction. In order to precisely control the feed speed and the rotation speed of the spindle, a thread cutting machine which detects Z-movement of the spindle for controlling the rotation of the spindle has been developed (Japanese Patent Publication No. SHO 60-155319). Additionally, a thread cutting machine in which rotation control data is computed according to the axial feed speed and acceleration of the spindle has been developed (Japanese Patent Publication No. SHO 63-251121, which corresponds to U.S. Pat. No. 4,879,660).

However, when the tapping tool is drilled into the workpiece, an axial load is generated between the tapping tool and the workpiece. Several types of tapping tools (for example, so-called S, P, or H taps) generate axial loads depending on the tool in either upward or downward directions. FIG. 1 shows a schematic view for illustrating loads generated by threading. FIG. 1 shows a case in which a downward load $F_A$ is applied to a workpiece 17, and in which the rotation speed and feed speed are constant. When the rotation speed is set to the feed speed divided by the feeding pitch P (in this case, the same as the cutting pitch), an axial load $F_A$ is generated. The axial load $F_A$ is similarly generated when the feed speed is set to the feeding pitch P multiplied by the rotation speed.

When a rolled tap is used, the axial load $F_A$ may be as high as 200 kgf. This axial load $F_A$ causes a deflection in the same direction in the workpiece 17 and the spindle. When a tapping tool 15 is drilled into the workpiece, the beginning of the thread 51 is cut under this deflection. Since the threading is controlled according to the beginning of the cut and according to above-mentioned direct relationship between feed speed, tapping tool cutting pitch and spindle rotation speed, the axial load $F_A$ continues during thread cutting.

Thus, when the workpiece 17 is thin, it may be deformed by the axial load $F_A$. Furthermore, since the cutting edge of the tapping tool suffers from abrasion under the high axial load, the lifetime of the tapping tool may be shortened, and consistent high-speed machining becomes impossible.

SUMMARY OF THE INVENTION

It is therefore an object of the present invention to provide an improved thread cutting machine in which the load is reduced for preventing the deformation of a workpiece, for lengthening the lifetime of a tapping tool, and for enabling high speed machining.

In order to solve the objects of the invention, a thread cutting apparatus includes a rotatable spindle; a tapping tool attached to the rotatable spindle, the tapping tool having a cutting pitch at which threads are cut in a workpiece; control means for controlling an axial feeding speed, rotating speed, and axial feeding position of the tapping tool relative to the workpiece; means for generating a counterload in an opposite direction to an axial load on the workpiece while maintaining the cutting pitch during thread cutting of the workpiece. The counterload, in the opposite direction to the axial load, reduces the level of the net axial load. Consequently, excessive deformation of the workpiece is prevented, and high speed cutting is possible.

Preferably, the control means includes: rotating means for relatively rotating the tapping tool and a workpiece at a predetermined rotating speed; feeding means for relatively axially feeding the tapping tool and the workpiece at a predetermined feeding speed related to the rotating speed by a feeding pitch; and an input unit for inputting the feeding pitch. The means for generating a counterload generates the counterload according to a predetermined relationship between the feeding pitch and the axial load. Accordingly, the counterload, reducing the net axial load, can be specified by inputting a value of feeding pitch having a known relationship to the axial load, allowing control of the net axial load.

In one preferred embodiment, the means for generating a counterload includes: load detecting means for detecting an axial load on the feeding means when the tapping tool taps the workpiece; and correcting means for correcting at least one of the rotating speed, feeding speed, or feeding pitch according to the detected axial load to reduce the axial load while maintaining the cutting pitch. Since the feeding speed, rotation speed, and feeding pitch are interdependent, correcting one of them according to a detected axial load enables the counterload to be generated, to reduce the net axial load, using the known relationship between feeding pitch and axial load.

In a particular development of this embodiment, the rotating means relatively rotates the tapping tool and a workpiece at a rotating speed equal to the feeding speed divided by the feeding pitch, and the correcting means changes the feeding pitch according to the detected axial load to change the rotation speed in a direction to decrease the axial load. By changing the feeding pitch, the rotating speed is thereby changed, generating the counterload to reduce the net axial load. In this case, the feeding speed is unaffected.

In another development of this embodiment, the correction means includes: instruction means for sending a feeding speed instruction; feeding control means for setting a feeding speed of the tapping tool according to the feeding speed instruction; conversion means for converting the feeding speed instruction, according to a predetermined ratio, to a rotation speed instruction, rotation control means for setting a rotation speed of the tapping tool according to the rotation speed instruction; feedback means for correcting rotation speed when a feeding feedback signal, taken from detected feeding speed, deviates from the feeding speed instruction; means for changing the feeding speed away from the feeding speed instruction; means for compensating the feeding feedback signal, in response to the means for changing, to maintain the rotation speed uncorrected even when the detected feeding speed is changed from the feeding speed instruction. In this manner, the feeding speed is changed, but since the rotation speed is derived from the feeding speed and is maintained according to a (slave) feeding feedback signal taken from the feeding speed, the feeding feedback signal is compensated to keep the rotation speed unchanged. The combination of changing the feeding speed and keeping the rotation speed constant generates the counterload to reduce the net axial load.

In yet another development of this embodiment, the correction means includes: instruction means for sending a feeding instruction; feeding control means for feeding the tapping tool according to the feeding instruction; conversion means for converting the feeding instruction according to a predetermined ratio to a rotation instruction, rotation control means for rotating the tapping tool according to the rotation instruction; feedback means for correcting rotation deviation from the rotation instruction according to a rotation feedback signal representing detected rotation; means for changing the rotation away from the rotation instruction; means for compensating the rotation feedback signal, in response to the means for changing, to allow the changing of rotation even when the rotation deviates from the rotation instruction. In this manner, the rotation speed is changed, and the feeding speed remains unaffected. However, since the rotation is maintained according to a rotation feedback signal compared to the rotation instruction, the rotation feedback signal is compensated to allow the rotation to deviate from the instruction. The combination of changing the rotation speed and keeping the feeding speed constant generates the counterload to reduce the net axial load.

In another preferred embodiment, the means for generating a counterload includes: a function generator for generating a feeding pitch function according to the feeding pitch. The feeding speed and the rotating speed are determined according to a relationship with the feeding pitch function to change the axial load while maintaining the cutting pitch. In this manner, the feeding pitch is sent as a varying function of feeding pitch, derived from a known relationship between the feeding pitch and the axial load, to generate the counterload, reducing the net axial load. This embodiment may further include load detecting means for detecting an axial load on the feeding means when the tapping tool taps the workpiece; and correcting means for correcting the feeding speed according to the detected axial load to reduce the axial load while maintaining the cutting pitch. The combination of a feeding pitch function, load detecting means, and correcting means allows both the reduction of the axial load by the generation of a counterload, and the correction of increases and instabilities in axial load away from the known relationship of the feeding pitch function, such as in cases of tool wear.

According to another aspect of the invention, a thread cutting machine comprises: a spindle equipped with a tapping tool having a cutting pitch at which threads are tapped; control means to which a feeding pitch corresponding to the cutting pitch is input; rotating means for relatively rotating the tapping tool and a workpiece at a rotating speed; feeding means for relatively axially feeding the tapping tool and the workpiece at a feeding speed related to the rotating speed and the input feeding pitch; load detecting means for detecting an axial load on the feeding means when the tapping tool taps the workpiece; and correcting means for correcting at least one of the rotating speed, feeding speed, or feeding pitch according to the detected axial load to reduce the axial load while maintaining the cutting pitch. Since the feeding speed, rotation speed, feeding pitch, and axial load are interdependent, correcting one of the speeds or the feeding pitch according to a detected axial load enables the reduction of the axial load, using the known relationship between feeding pitch and axial load.

In one particular embodiment, the rotating means relatively rotates the tapping tool and a workpiece at a rotating speed equal to the feeding speed divided by the feeding pitch, and the correcting means changes the feeding pitch according to the detected axial load to change the rotation speed in a direction to decrease the axial load. By changing the feeding pitch, the rotating speed is thereby changed, generating the counterload to reduce the net axial load. In this case, the feeding speed is unaffected.

According to still another aspect of the invention, a thread cutting apparatus includes: a rotatable spindle having a tapping tool attached, the tapping tool being axially feedable and rotatable; instruction means for sending a feeding speed instruction; feeding control means for setting a feeding speed of the tapping tool according to the feeding speed instruction; conversion means for converting the feeding speed instruction according to a predetermined ratio to a rotation speed instruction, rotation control means for setting a rotation speed of the tapping tool according to the rotation speed instruction; feedback means for correcting rotation speed when a feeding feedback signal, taken from detected feeding speed, deviates from the feeding speed instruction; means for changing the feeding speed away from the feeding speed instruction; means for compensating the feeding feedback signal, in response to the means for changing, to maintain the rotation speed uncorrected even when the detected feeding speed is changed from the feeding speed instruction. In this manner, the feeding speed is changed, but since the rotation speed is derived from the feeding speed and is maintained according to a (slave) feeding feedback signal taken from the feeding speed, the feeding feedback signal is compensated to keep the rotation speed unchanged. The combination of changing the feeding speed and keeping the rotation speed constant reduces the axial load.

According to yet another aspect of the invention, a thread cutting machine includes: a spindle having a tapping tool attached, the tapping tool being axially feedable and rotatable; instruction means for sending a feeding instruction; feeding control means for feeding the tapping tool according to the feeding instruction; conversion means for converting the feeding instruction according to a predetermined ratio to a rotation instruction; rotation control means for rotating the tapping tool according to the rotation instruction; feedback means for correcting rotation deviation from the rotation instruction according to a rotation feedback signal representing detected rotation; means for changing the rotation away from the rotation instruction; means for compensating the rotation feedback signal, in response to the means for changing, to allow the changing of rotation even when the rotation deviates from the rotation instruction. Accordingly, the feeding speed remains unaffected as the rotation speed is changed. However, since the rotation is maintained according to a rotation feedback signal compared to the rotation instruction, the rotation feedback signal is compensated to allow the rotation to deviate from the instruction. The combination of changing the rotation speed and keeping the feeding speed constant reduces the axial load.

According to yet still another aspect of the invention, a thread cutting apparatus includes: a spindle equipped with a tapping tool having a cutting pitch at which threads are tapped; control means to which a feeding pitch corresponding to the cutting pitch is input; rotating means for relatively rotating the tapping tool and a workpiece at a rotating speed; feeding means for relatively axially feeding the tapping tool and the workpiece at a feeding speed; a function generator for generating a feeding pitch function according to the feeding pitch;and rein the feeding speed and the rotating speed are determined according to a relationship with the feeding pitch function to change the axial load while maintaining the cutting pitch. Preferably, the function generator generates a plurality of functions. In this manner, the feeding pitch is sent as a varying function of feeding pitch, derived from a known relationship between the feeding pitch and the axial load, to reduce the axial load.

According to a further aspect of the invention, a thread cutting apparatus includes: a spindle equipped with a tapping tool having a cutting pitch at which threads are tapped; control means to which a feeding pitch corresponding to the cutting pitch is input; rotating means for relatively rotating the tapping tool and a workpiece at a rotating speed; feeding means for relatively axially feeding the tapping tool and the workpiece at a feeding speed; a function generator for generating a feeding pitch function according to the relative feeding position; wherein the feeding speed and the rotating speed are determined according to the feeding pitch function to change the axial load at differing relative feeding positions while maintaining the cutting pitch. In this manner, the feeding pitch is sent as a varying function of feeding pitch versus feeding position, derived from a known relationship between the feeding pitch, the feeding position, and the axial load, to reduce the axial load at differing relative feeding positions.

According to a still further aspect of the invention, a thread cutting method, applied in a thread cutting machine having a tapping tool with a cutting pitch, includes the steps of: setting a rotation speed of a tapping tool to a feeding speed divided by a feeding pitch; detecting an axial load on the tapping tool when the tapping tool cuts threads in a workpiece; and generating a counterload in a direction opposite to the axial load while maintaining the cutting pitch. The counterload, in the opposite direction to the axial load, reduces the level of the net axial load. Consequently, excessive deformation of the workpiece is prevented, and high speed cutting is possible.

According to a still further aspect of the invention, a thread cutting method, applied in a thread cutting machine having a tapping tool with a cutting pitch, includes the steps of: generating a feeding pitch function defining a predetermined feeding pitch for any feeding position; setting a rotation speed of a tapping tool to a feeding speed divided by the feeding pitch function; cutting threads in a workpiece according to the feeding pitch function. In this manner, the feeding pitch is sent as a varying function of feeding pitch versus feeding position, derived from a known relationship between the feeding pitch, the feeding position, and the axial load, to reduce the axial load at differing relative feeding positions.

DETAILED DESCRIPTION OF THE PREFERRED EMBODIMENTS

Figure 2:
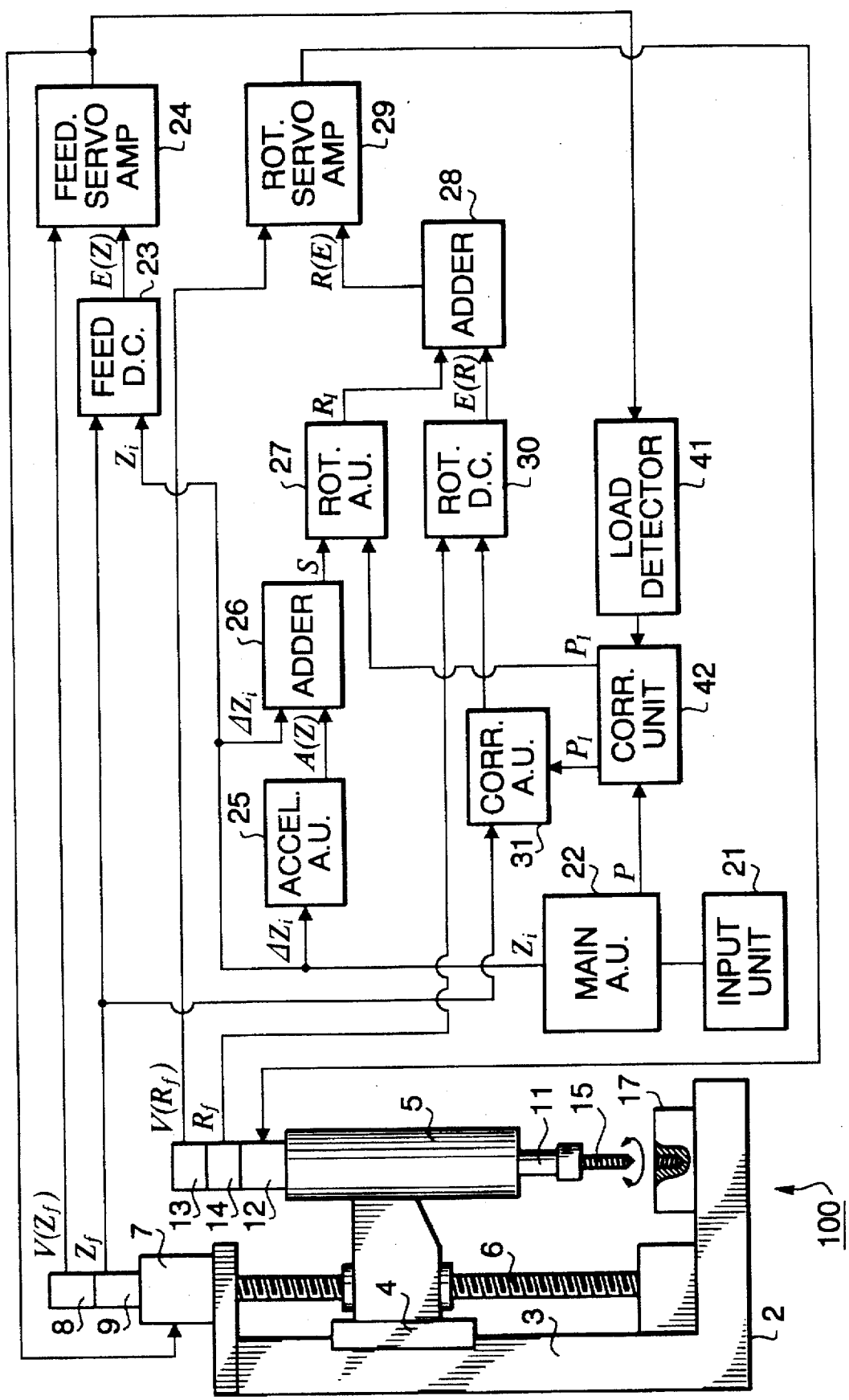
FIG. 2 is a block diagram schematic of a first embodiment of a thread cutting machine according to the invention.

A block diagram representation of first embodiment of a thread cutting machine 100 according to the invention is shown in FIG. 2.

As shown in FIG. 2, the thread cutting machine 100 is a standing-type tapping machine. A spindle head 5 is movably supported, via a slider 4, by a column 3. The column 3 is further supported on a base 2. The spindle head 5 is engaged with a ball screw 6 driven by an AC-servo feeding motor 7.

The feeding motor 7 is provided with a tachometer 8 for detecting feeding speed and a feeding (angular) position pulse generator 9 for detecting the feeding position. The pulse generator 9 provides pulses representing the rotational angle of the feeding motor 7 shaft.

A spindle 11 is rotatably supported within the spindle head 5, and is rotated by an AC servo spindle rotation motor 12 provided to the spindle head 5. The rotation motor 12 is provided with a tachometer 13 for detecting rotating speed and rotating (angular) position pulse generator 14. A tapping tool 15 having a certain cutting pitch, selected from a variety of tapping tools (for example, so-called S, P, or H taps) is mounted to the spindle 11. The tapping tool 15 taps threads at the cutting pitch in a hole 16 formed in a workpiece 17. Hereinafter "cutting pitch" denotes the actual thread pitch of the tapping tool 15, while "feeding pitch" is used in calculations and operations to feed the tapping tool 15.

Data representing the desired cutting operation, including a desired feeding speed, is supplied from an input unit 21. The data is processed in a main arithmetic unit (MAIN A.U.) 22 to provide a feed instruction pulse $Z_i$. The feed instruction pulse $Z_i$ is supplied to a feed deviation counter (FEED D.C.) 23 in the form of a pulse train corresponding to the desired feeding speed. Feeding (angular) position feedback $Z_f$ is provided from the feeding position pulse generator 9 to the feed deviation counter 23. The feed deviation counter 23 computes the deviation:

$$E(Z)=Z_i-Z_f \quad (1)$$

The computed deviation E(Z) is applied to a feed servo amplifier (FEED SERVO AMP) 24 as an instruction signal representing the desired feeding speed. A feeding (angular) speed feedback signal $V(Z_f)$ from the tachometer 8, corresponding to the actual speed, is also input to the feed servo amplifier 24, thus constituting a speed loop circuit to drive the feed motor 7. A conventional control circuit (not shown) is used for this feed system.

In the spindle rotation system, the rotation instruction signal R is computed based on the feed instruction pulse $Z_i$. The feed instruction pulse $Z_i$ is input into an acceleration arithmetic unit (ACCEL A.U.) 25. The acceleration arithmetic unit 25 computes a feed acceleration from a difference $\Delta Z_i$ of the feed instruction pulse $Z_i$, as shown in the equation:

$$A(Z)=d/dt*\Delta Z_i \quad (2)$$

The acceleration arithmetic unit 25 outputs the feed acceleration A(Z) to an adder 26. The feeding position feedback pulse $Z_f$ from the feeding position pulse generator 9 is also input into the adder 26 as a difference $\Delta Z_f$. The adder 26 adds the feed amount difference $\Delta Z_f$ to the feed acceleration A(Z) and outputs it to a rotation arithmetic unit (ROT. A.U.) 27. The output S from the adder 26 is a sum of the feed speed difference and feed acceleration, as shown in the equation:

$$S=\Delta Z_f+d/dt*\Delta Z_i \quad (3)$$

The rotation arithmetic unit 27 computes a rotation instruction signal, as shown in the equation:

$$R_1=L/P*S=L/P*(\Delta Z_f+d/dt*\Delta Z_i) \quad (4)$$

In this case, P is a feeding pitch and L is the lead of the ball screw 6 (both input from the input unit 21). In this case, the feeding pitch P corresponds to the cutting pitch. That is, the feeding pitch P used for calculations is the same as the actual thread pitch of the tapping tool 15. The rotation instruction signal $R_1$ from the rotation arithmetic unit 27 is then output to an adder 28. The adder 28 is provided for correcting the rotation instruction signal $R_1$ by adding a rotation deviation function E(R).

The rotation deviation function E(R) is generated by a correction arithmetic unit (CORR. A.U.) 31 and rotation deviation counter (ROT. D.C.) 30. The correction arithmetic unit 31 uses the feeding position feedback pulse $Z_f$ pulse and the feeding pitch P from the input unit 21 to compute a rotation correction function $R(Z_f)$, as shown in the equation $$R(Z_f)=L/P*Z_f \quad (5)$$

The correction arithmetic unit then outputs the rotation correction function $R(Z_f)$ to the rotation deviation counter 30. The rotation deviation counter 30 computes the rotation deviation E(R) from the rotation correction function $R(Z_f)$ and a rotation position pulse $R_f$ from the rotation position pulse generator 14, as shown in the equation $$E(R)=R(Z_f)-R_f \quad (6)$$

The rotation deviation counter then outputs the rotation deviation function E(R) to the adder 28.

As previously described, the adder 28 corrects the rotation instruction signal $R_1$ using the rotation deviation function E(R) to provide a corrected rotation instruction pulse function R(E), as shown in the equation $$R(E)=R_1+E(R) \quad (7)$$

The corrected rotation instruction pulse function R(E) is then supplied to a rotation servo amplifier (ROT. SERVO AMP) 29. A rotation speed feedback signal $V(R_f)$ from the tachometer 13, corresponding to the actual spindle speed, is also input to the rotation servo amplifier 29, thus constituting a speed loop circuit to drive the spindle rotation motor 12.

The above description describes the common portions of each embodiment. Each embodiment includes at least the above mentioned elements and relationships, except as noted below, where respective differences from the common portion are described.

Particular to the first embodiment, a load detector 41 detects the output of the feed servo amplifier 24 (current or voltage) and outputs a signal representative of the axial load to the correction unit 42. In this case, and throughout the description, a "downward" load is a downward, or pushing, load on the workpiece 17, and an "upward" load is an upward, or pulling, load on the workpiece 17. The load detector 41 is arranged to output zero when the tapping tool 15 rotates without tapping, and therefore detects and outputs the axial load generated by tapping. Alternatively, a strain gage or other sensor is provided between the spindle head 5 and spindle 11, or between the workpiece 17 and base 2, and the output (representative of axial load) is sent to the load detector 41.

A correction unit 42 is arranged to correct the supplied feeding pitch P according to a signal from the load detector 41 and to output a corrected pitch $P_1$. The correction unit 42 corrects the supplied feeding pitch P based on the magnitudes of the detected load (further, a positive or negative magnitude can indicate direction), supplied by the load detector 41, and the supplied feeding pitch P. For example, when a downward load is detected, a decreased corrected pitch $P_1$ is output; and when an upward load is detected, an increased corrected pitch $P_1$ is output. The correction unit contains a look-up table of empirical $P_1$ values for various loads and pitches. Alternatively, the correction unit calculates the corrected pitch $P_1$ based on a family of formulas representative of experimental data. For example, numerically, when the downward load is 100 kgf with a tapping tool having an actual thread (cutting) pitch of 2 mm, a feeding pitch P of 2 mm is reduced to be a corrected pitch $P_1$ of 1.99 mm by the correction unit 42. Thus, the correction unit 42 is a means for correcting the feeding pitch.

Figure 1:
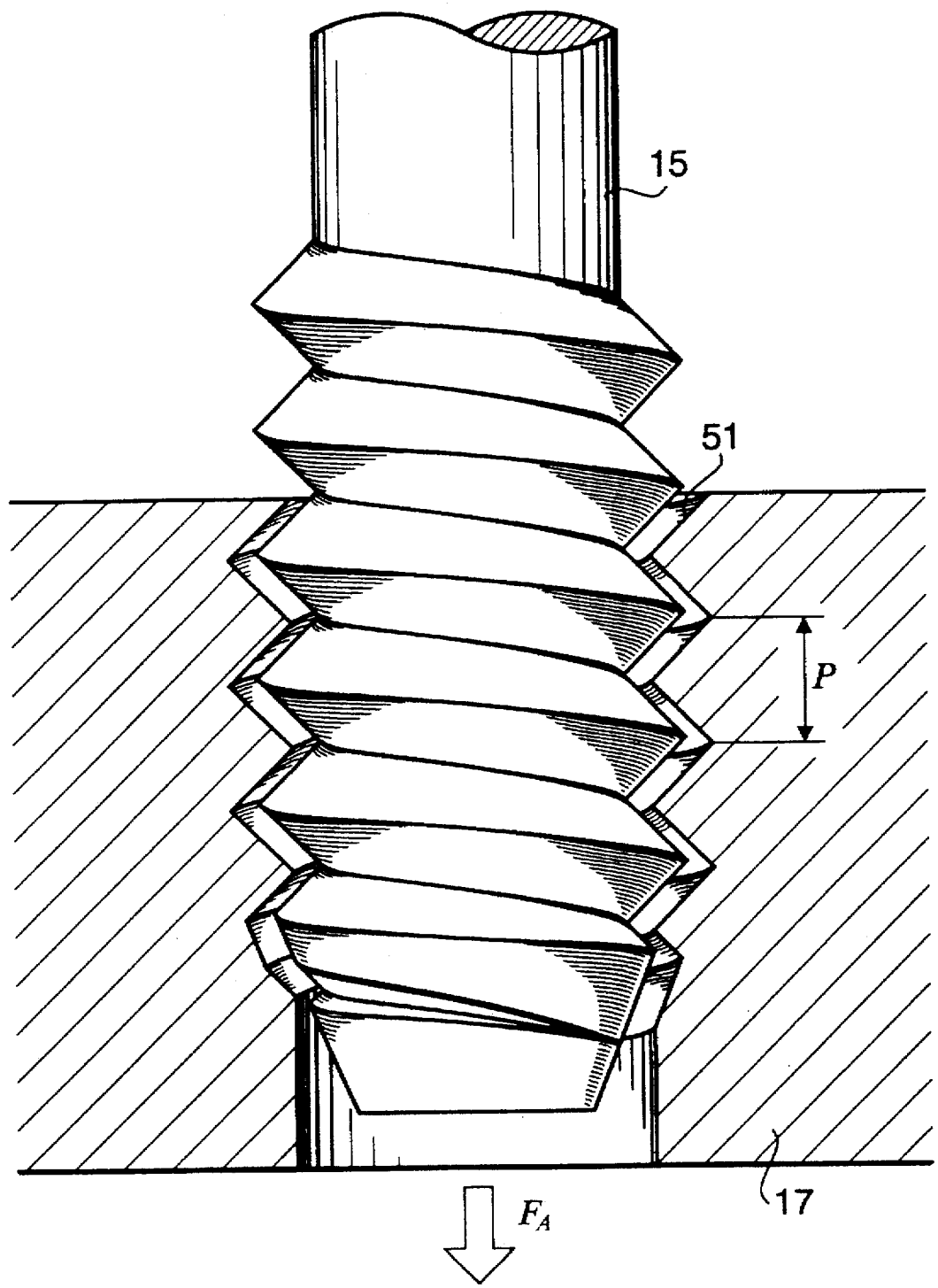
FIG. 1 shows a schematic view illustrating a load $F_A$ generated by thread cutting in a conventional thread cutting device.
Figure 3:
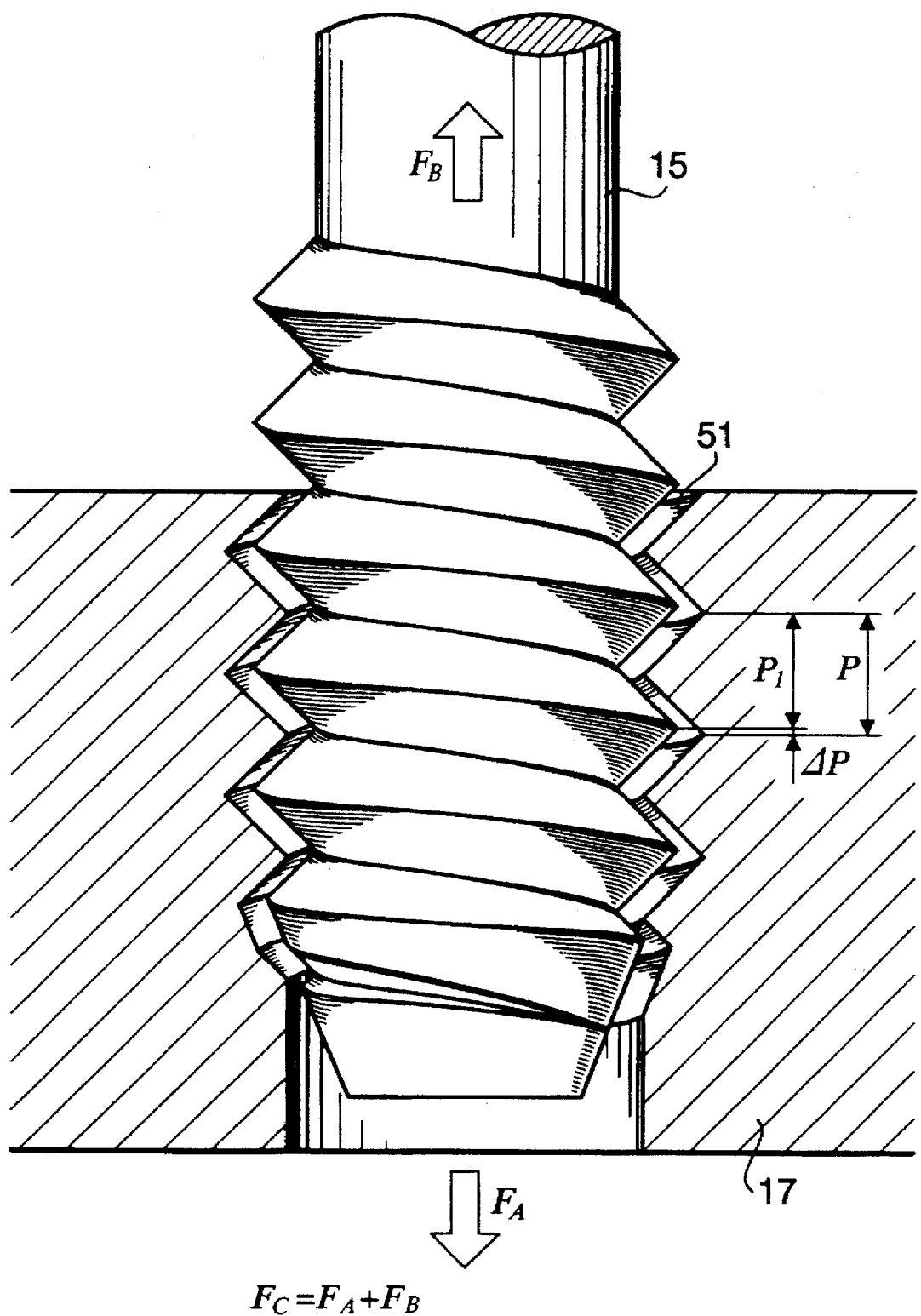
FIG. 3 shows a schematic view illustrating a load $F_A$ and counterload $F_B$ generated by thread cutting in the first and subsequent embodiments.

FIG. 3 shows a schematic view, similar to FIG. 1, for illustrating example loads generated by threading and the specific effect of a corrected pitch $P_1$, and of a counterload in general. FIG. 3 shows a case in which an axial load $F_A$ is applied to the workpiece, and in which the rotation speed is constant. A downward load $F_A$ is generated by the certain types of tools, and a downward load $F_A$ is shown in this example. When the pitch P is corrected (in this example, reduced) by $\Delta P$ to be the corrected pitch $P_1$, it produces a compensatory opposite counterload $F_B$. Although FIG. 3 shows a downward load $F_A$, the load $F_A$ may be an upward load, depending on the tool 15 selected, and the counterload $F_B$ is generated in the opposite direction. As $F_A$ and $F_B$ are in opposite directions, the net load $F_C$ (=$F_A$–$F_B$) applied to the workpiece is reduced. Consequently, the force applied to the tap 15 and to the workpiece 17 is reduced.

Thus, the correction unit 42, in combination with the load detector 41 and other control elements, supplies a corrected feeding pitch $P_1$ according to the axial load detected by the load detector 41. Consequently, the axial feed speed of the feed motor 7 remains at the value based on the set pitch P and the feed instruction pulse $Z_i$, while the actual rotation speed is based on the corrected pitch $P_1$. A counterload $F_B$ is generated, reducing the net load $F_C$. Therefore, the load generated by threading is reduced from the load $F_A$, preventing severe deformation or breakage of the workpiece, lengthening the lifetime of the tapping tool, and enabling high speed tapping operations.

Figure 4:
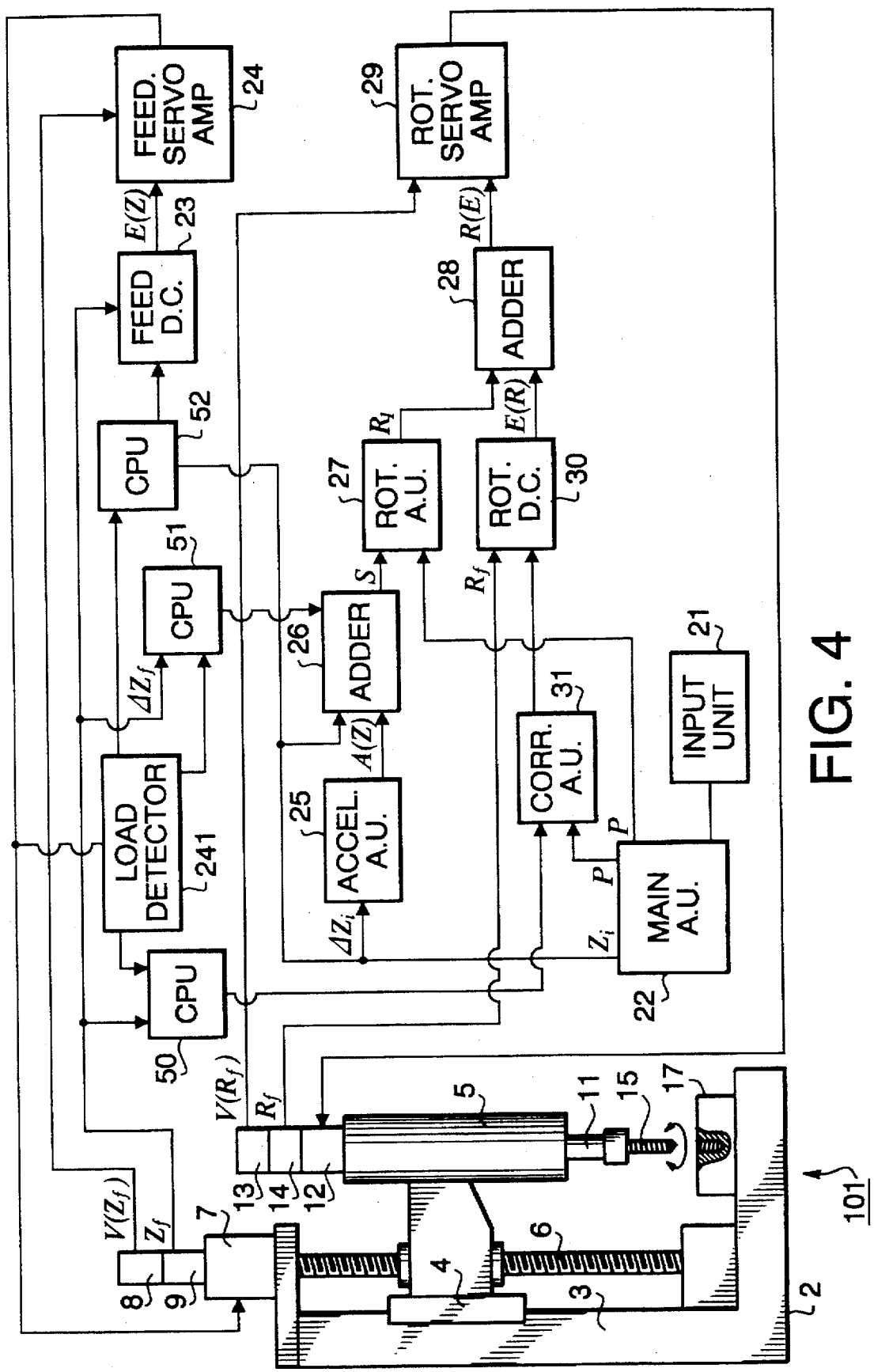
FIG. 4 is a block diagram schematic of a second embodiment of a thread cutting machine according to the invention.

A second embodiment of a thread cutting machine 101 according to the invention appears in FIG. 4. Particular to the second embodiment, pulse correction units (PCU) 50, 51, and 52 are provided for correcting an input pulse according to a signal <representing axial load) from a load detector 241; and for outputting a corrected pulse. All pulse correction units described hereinafter may correct an input pulse rate by adding pulses, by subtracting pulses, or by resampling to generate a different rate.

The load detector 241 is similar to that of the first embodiment. Again, an appropriately placed strain gage sensor may be used to supply a signal representative of the axial load on the spindle 11, instead of the output of the feed servo amp 24. All three pulse correction units increase or decrease an input pulse rate according to the input from the load detector 241. Specifically, when the pulse correction unit 52 corrects the feed instruction pulse $Z_i$ rate to correct the feeding speed, the pulse correction units 50 and 51 compensate the feeding position feedback pulse $Z_f$ by respective amounts to keep the spindle rotation motor 12 speed constant. It should be noted that the pulse correction unit 52 corrects pulses in an opposite direction to the remaining pulse correction units 50 and 51. For example, if the pulse correction unit 52 decreases and outputs a decreased feed instruction pulse $Z_i$ rate, the pulse correction units 50 and 51 increase and output corresponding feeding position feedback pulse $Z_f$ rates, and vice versa. The corrections are performed according to desired levels of load. For example, when an axial load is downward and higher than desired, the pulse correction unit 52 decreases the feed instruction pulse $Z_i$ and outputs the corrected feed instruction pulse $Z_i$ to the feed deviation counter 23. Consequently, the feeding speed is reduced. However, the rotation speed of the spindle 11 is also influenced by the feed instruction pulse $z_i$. Therefore, if the feed instruction pulse $Z_i$ is changed, the rotation speed of the spindle 11 is maintained at a constant level by the increase of the rate of position feedback pulse $Z_f$ by the pulse correction units 50 and 51. Thus, when the load $F_A$ is detected, the pulse correction unit 52 corrects the feed speed and the pulse correction units 50 and 51 maintain the rotation speed unchanged. This combination generates a counterload $F_B$, reducing the net load $F_C$, and the force applied to the tap 15 and to the workpiece 17 is reduced.

Figure 5:
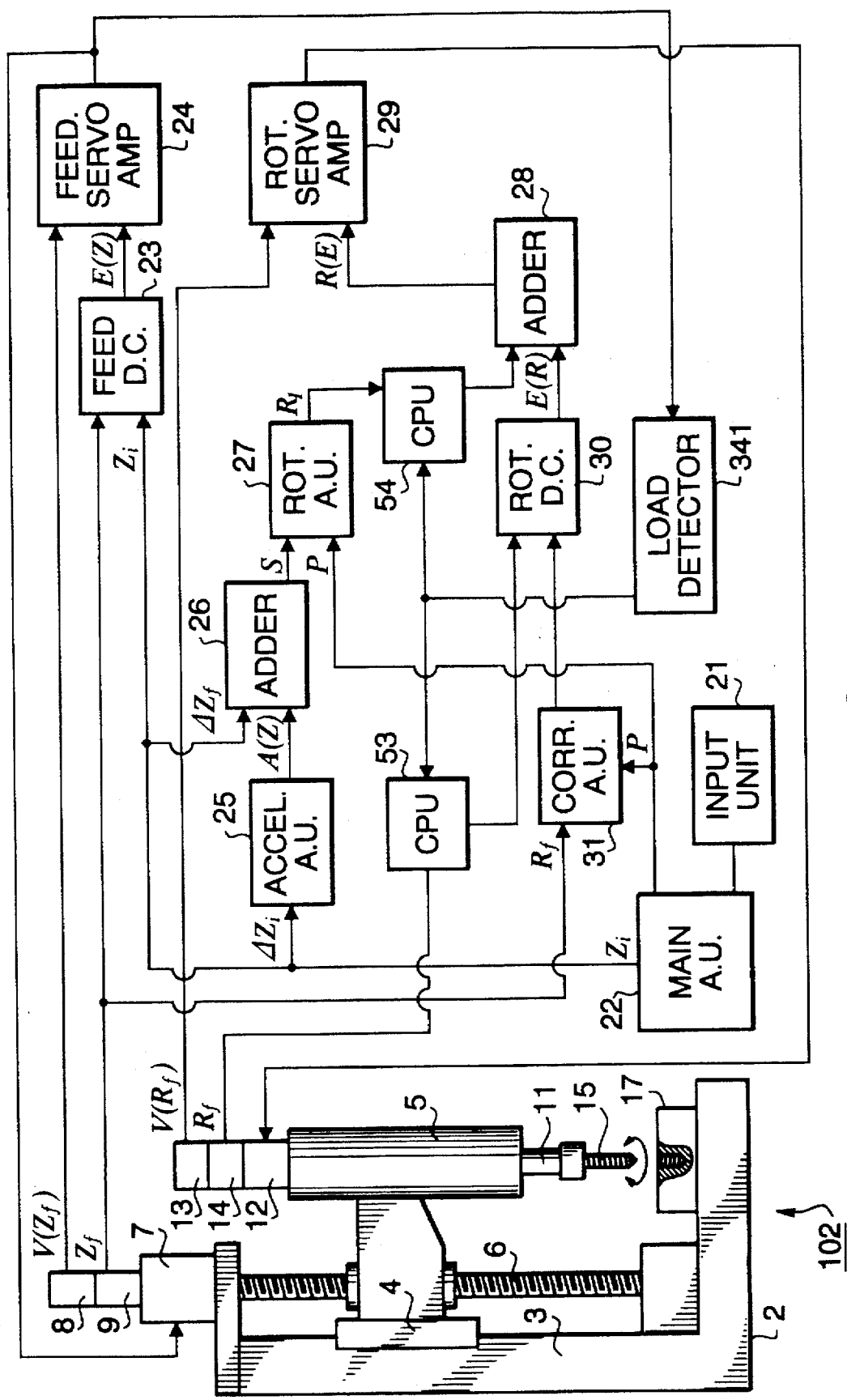
FIG. 5 is a block diagram schematic of a third embodiment of a thread cutting machine according to the invention.

A third embodiment of a thread cutting machine 102 according to the invention is shown in FIG. 5. As shown in FIG. 5, particular to the third embodiment, pulse correction units 53 and 54 are provided for correcting an input pulse and outputting a corrected pulse according to the axial load. The load detector 341 is similar to that of the first and second embodiments. Again, an appropriately placed strain gage sensor may be used instead of the output of the feed servo amp 24. Both pulse correction units 53 and 54 increase or decrease an input pulse rate according to the input from the load detector 341.

The pulse correction unit 54 changes the rotation instruction signal $R_1$ to correct the rotation speed, while pulse correction unit 53 changes the rate of the rotation position pulse $R_f$ in the opposite direction to maintain the rotation deviation function $E(R_f)$ unchanged. For example, if $F_A$ is downward and too high, the pulse correction unit 54 increases the rotation instruction signal $R_1$ to correct the rotation speed and generate a counterload $F_B$, while the pulse correction unit 53 decreases the rate of the rotation position pulse $R_f$ to maintain the rotation deviation function $E(R_f)$ unchanged.

In the absence of the pulse correction unit 53, since the rotation deviation counter 30 calculates the rotation deviation function $E(R_f)$ from the rotation correction function $R(Z_f)$ and the rotation position feedback signal pulse $R_f$, if the rotation speed is increased (as in this example), the rotation deviation function $E(R)$ is also increased. However, the compensation made by the pulse correction unit maintains the rotation deviation function $E(R)$ unchanged. Since the feeding speed is controlled directly by the instruction $Z_i$, it remains unchanged.

Thus, in the third embodiment, the rotation speed is changed while the feeding speed is kept constant. Consequently, a counterload $F_B$ is generated, reducing the net load $F_C$.

Figure 6:
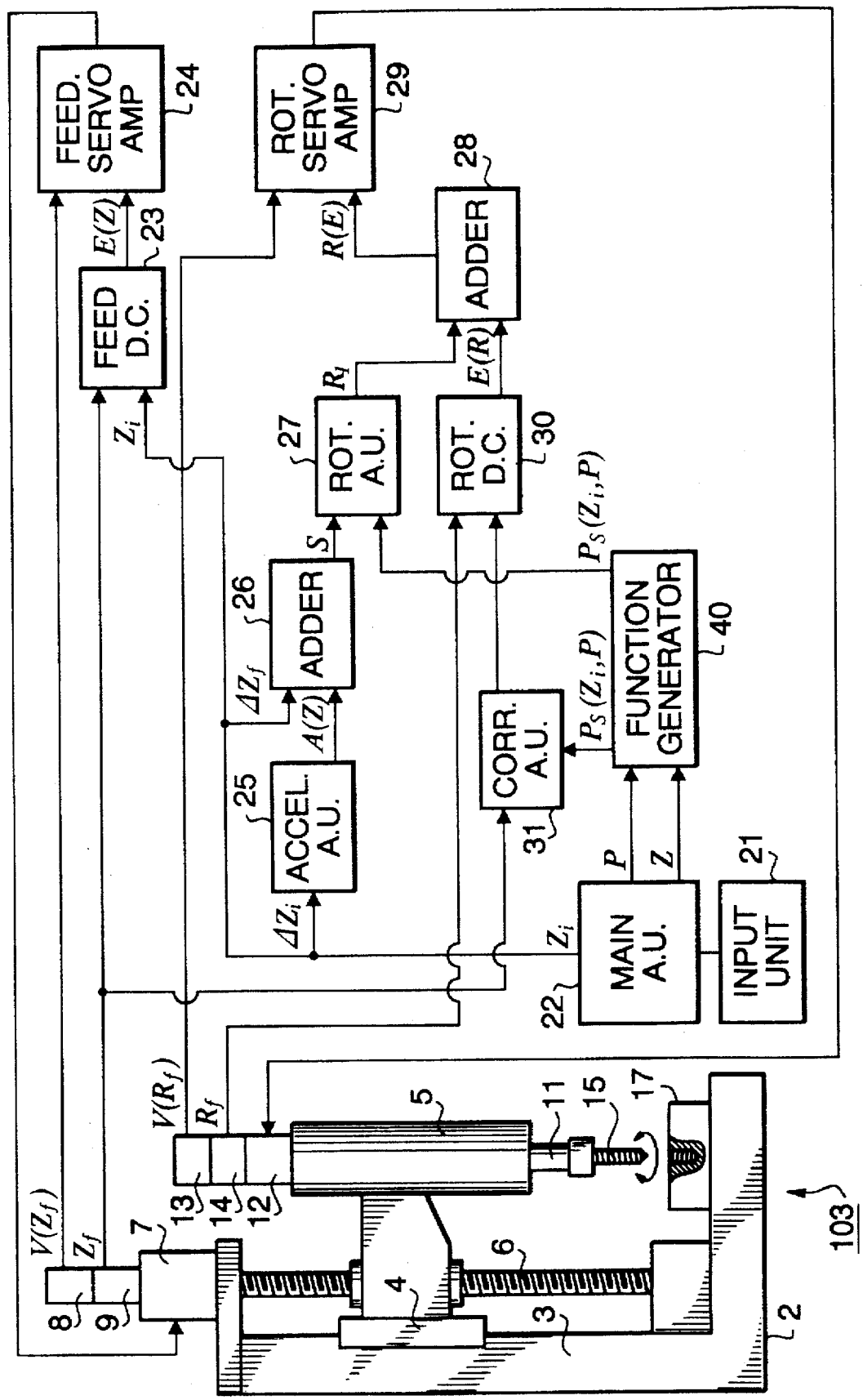
FIG. 6 is a block diagram schematic of a fourth embodiment of a thread cutting machine according to the invention.

A fourth embodiment of a thread cutting machine 103 according to the invention is shown in FIG. 6. As shown in FIG. 6, particular to the fourth embodiment, a function generator 40 is provided for generating a pitch function $P_F(Z,P)$.

Figure 7A:
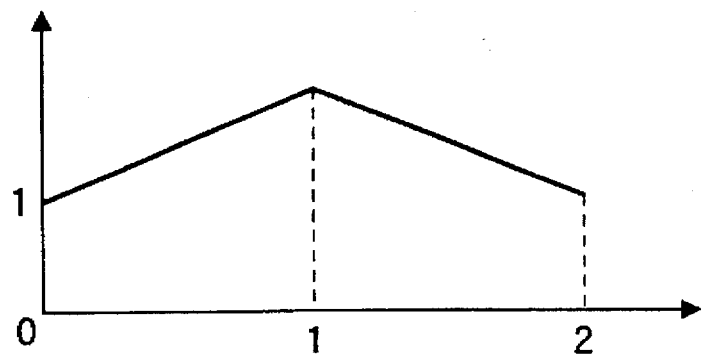
FIG. 7A shows an example of a selected waveform applied in the fourth embodiment.

The function generator 40 generates a variety of functions, each given a function label number. When a function label number, pitch P and threading depth are input from the input unit 21, the function generator 40 generates a pitch function $P_F(Z,P)$ from the function corresponding to the function label number. An example pitch function is shown in FIG. 7A. When the function label number for the pitch function shown in FIG. 7A is selected, the function generator 40 generates the pitch function $P_F(Z,P)$ shown in FIG. 7B. Particularly, the vertical axis of the pitch function $P_F(Z,P)$ is a product of the chosen function and the input pitch P, while the horizontal axis of the pitch function $P_F(Z,P)$ is a product of the chosen function and the input threading depth.

The feed instruction signal $Z_i$ is also input to the function generator 40. The function generator 40 generates a pitch function signal $P_S(Z_i,P)$ according to the pitch function $P_F(Z,P)$ and the feed instruction signal $Z_i$, and outputs the pitch function signal $P_S(Z_i,P)$ to the rotation instruction arithmetic unit 27 and to the rotation correction arithmetic unit 31.

However, in this case, the variety of functions that the function generator 40 generates are each determined based on empirical data giving a relationship between known loads for a given pitch, feed speed, feed depth, tool type, and rotation speed. The function generator 40 is able to generate at least the functions $P_F(Z,P)$ shown in FIGS. 8A through 8E. In order, the functions $P_F(Z,P)$ shown in FIGS. 8A through 8E are: a function having a constant value irrespective of the load, a function having a proportional value to the load (similar to that of FIG. 7A), a function having a convergence value, a function having a pulse-shaped wave form, and a function $P_F(Z,P)$ having a smaller value than P, respectively.

Figure 9A:
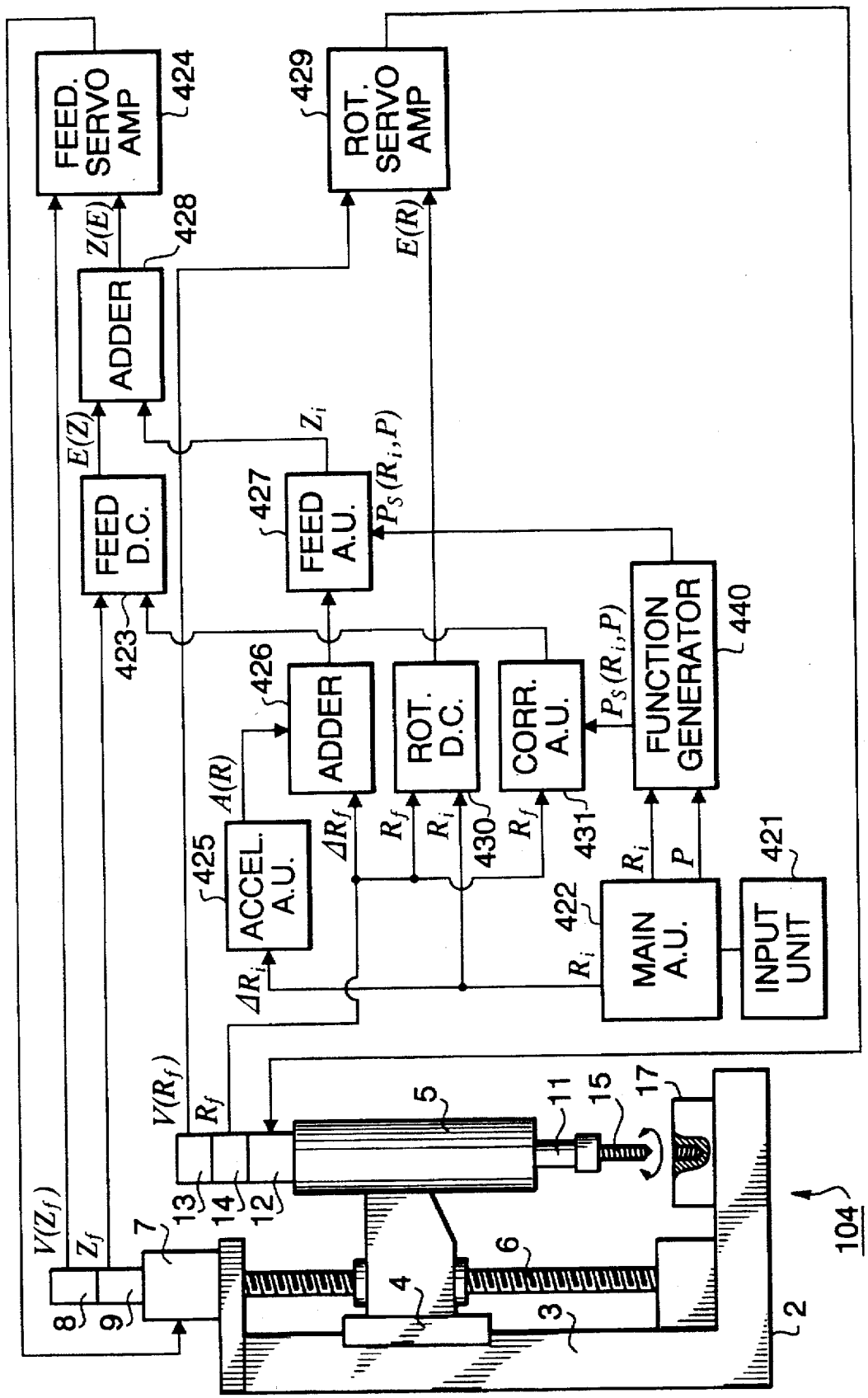
FIG. 9A is a block diagram schematic of a variation of the fourth embodiment of a thread cutting machine according to the invention.

FIG. 9A shows a variation of the fourth embodiment (the variation shares a common portion disclosed in Japanese Patent Publication No. SHO 64-58425) a thread cutting machine 104 that is similarly controlled by a function generator 440, although in the variation of the embodiment, the feeding speed instruction is calculated from rotation speed, feeding pitch and rotational acceleration. The operation of the variation of the fourth embodiment is analogous to the fourth embodiment. However, as shown in FIG. 9A, the control arrangement is an inversion of the arrangement of the fourth embodiment, with respect to the relationship between feeding speed and rotation speed. That is, in the variation of the fourth embodiment, the rotation speed is sent as an instruction $R_i$, and the feeding speed is derived from the rotation speed. In particular, data representing the desired cutting operation, including a desired rotation speed, is supplied from an input unit 421. The data is processed in a main arithmetic unit 422, providing a rotation instruction pulse $R_i$, which is supplied to a rotation deviation counter 430 along with rotational position feedback $R_f$ from the rotation position pulse generator 14. The rotation deviation counter 430 computes the deviation $E(R)=R_i-R_f$, which is applied to a rotation servo amplifier 429 along with a rotational speed feedback signal $V(R_f)$ from the tachometer 13, constituting a speed loop circuit to drive the spindle rotation motor 12. A conventional control circuit (not shown) is used for this rotation system.

In the spindle feeding system, the feeding instruction signal $F_1$ is computed based on the rotation instruction pulse $R_i$. The rotation instruction pulse $R_i$ is input into an acceleration arithmetic unit 425, which computes a rotation acceleration $A(R)=d/dt*\Delta R_i$ which is added by an adder 426 to a difference $\Delta R_f$ of the rotation position feedback pulse $R_f$. The sum, $\Delta R_f+A(R)$, is sent to a feeding arithmetic unit 427, which multiplies by P/L to give a feed instruction signal $F_1$. The feed instruction signal $F_1$ is output to an adder 428, which corrects the rotation instruction signal $F_1$ by adding a feed deviation function $E(Z)$.

The feed deviation function $E(Z)$ is generated by a correction arithmetic unit 431 which computes a feed correction function $Z(R_f)=P/L*R_f$, and a feed deviation counter 423, which computes a feed deviation $E(Z)=Z(R_f)-Z_f$ from the feed correction function $Z(R_f)$ and a feed position pulse $Z_f$. The feed deviation function $E(Z)$ is sent to the adder 428.

As previously described, the adder 428 corrects the feed instruction signal $F_1$ using the feed deviation function $E(Z)$ to provide a corrected feed instruction pulse function $Z(E)=Z_1+E(Z)$, which then supplied to a feed servo amplifier (FEED SERVO AMP) 429, along with the feed speed feedback signal $V(Z_f)$ from the tachometer 8 constituting a speed loop circuit to drive the feeding motor 7.

As shown in FIG. 9A, particular to the variation of the fourth embodiment, a function generator 440 is provided for generating a pitch function $P_F(R,P)$.

The function generator 440 generates functions similarly to the fourth embodiment, although the functions specify rotation speed instead of feeding speed. When a function label number, pitch P and threading depth are input from the input unit 421, the function generator 440 generates a pitch function $P_F(R,P)$ from the function corresponding to the function label number. The feed instruction signal $R_i$ is also input to the function generator 440. The function generator 440 generates a pitch function signal $P_S(R_i,P)$ according to the pitch function $P_F(R,P)$ and the feed instruction signal $R_i$, and outputs the pitch function signal $P_S(R_i,P)$ to the feed instruction arithmetic unit 427 and to the rotation correction arithmetic unit 431.

Figure 7B:
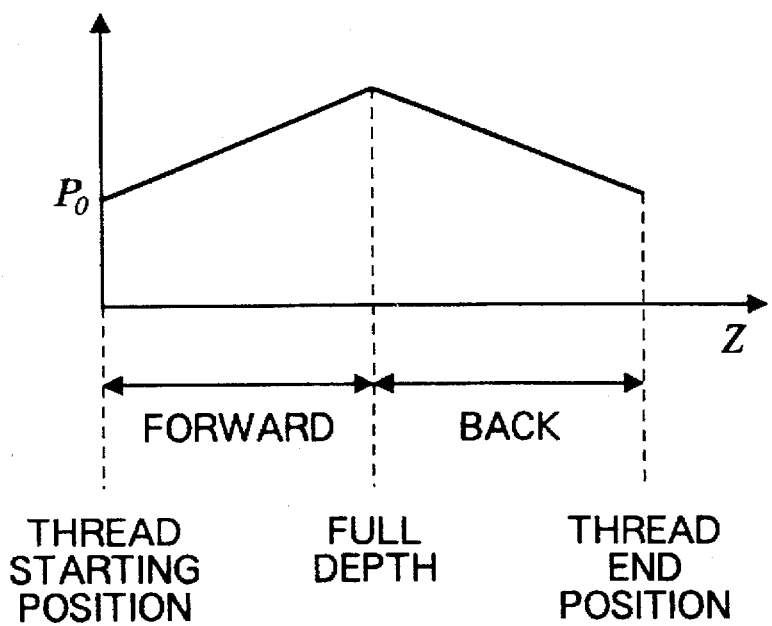
FIG. 7B shows a waveform of a function generated from the selected waveform of FIG. 7A.
Figure 8B:
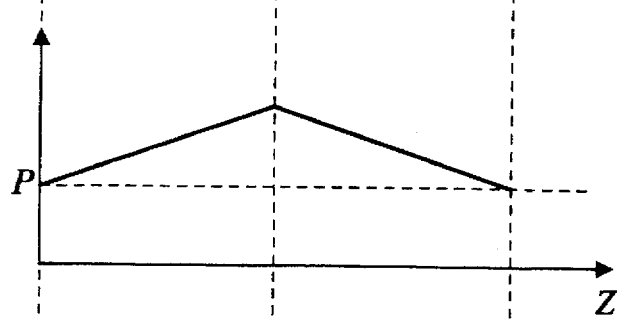
FIG. 8B shows a waveform of an example function $P_F(Z,P)$ having a proportional value to the load.
Figure 8C:
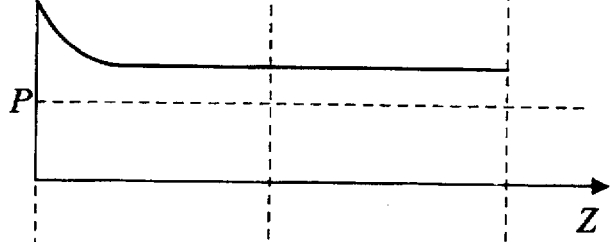
FIG. 8C shows a waveform of an example function $P_F(Z,P)$ having a convergence value.
Figure 8D:
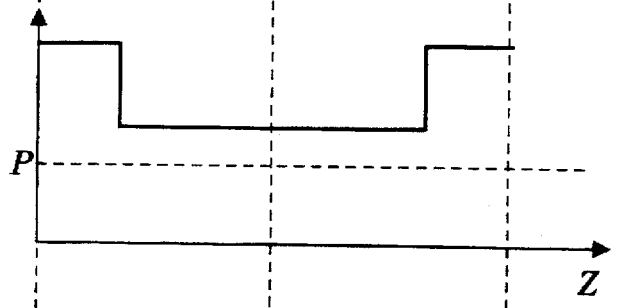
FIG. 8D shows a waveform of an example function $P_F(Z,P)$ having a pulse-shaped wave form.
Figure 8E:
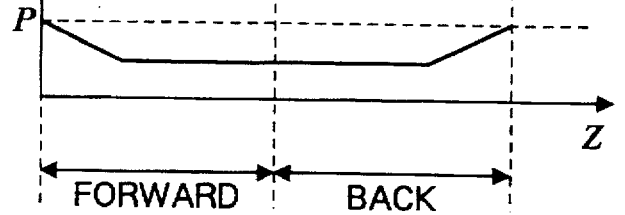
FIG. 8E shows a waveform of an example function $P_F(Z,P)$ having a smaller feed pitch value than the cut pitch.
Figure 9B:
FIG. 9B shows a waveform of feed speed of the fourth embodiment when the function of FIG. 7B is applied.
Figure 9C:
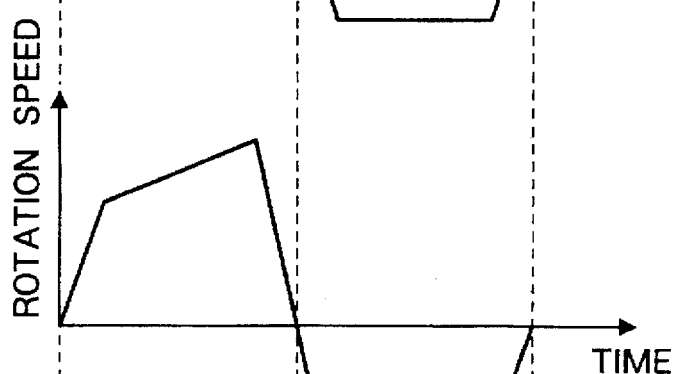
FIG. 9C shows a waveform of rotation speed of the fourth embodiment when the function of FIG. 7B is applied.
Figure 9D:
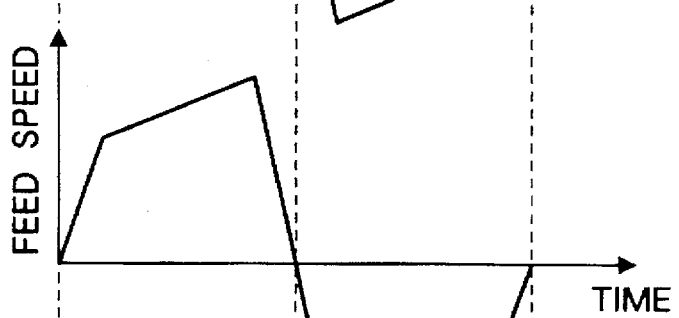
FIG. 9D shows a waveform of feed speed of the variation of the fourth embodiment when a function similar to that of FIG. 7B is applied.
Figure 9E:
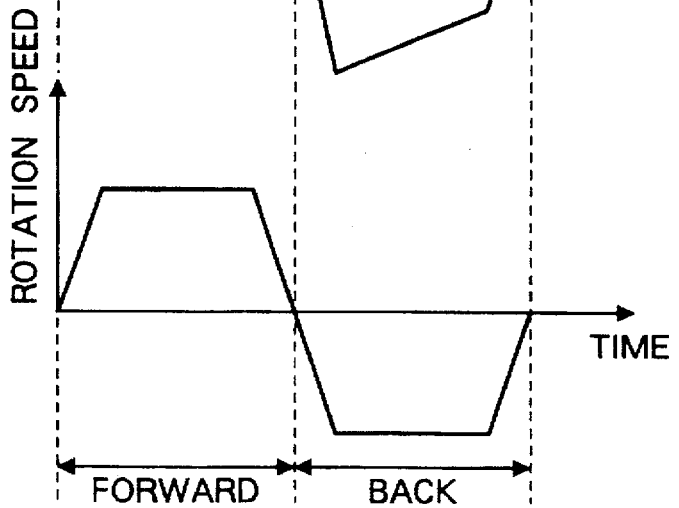
FIG. 9E shows a waveform of rotation speed of the variation the fourth embodiment when a function similar to that of FIG. 7B is applied.

FIGS. 9B, 9C, 9D, and 9E show the responses of feed speed and rotation speed, respectively, of the fourth embodiment and for the variation thereof, to a function having a proportional value to the load. That is, when a function $P_F(Z,P)$ similar to that shown in FIG. 8B and 7B is applied by the function generator 40 in the fourth embodiment shown in FIG. 6, the feed speed and rotation speed vary as shown in FIGS. 9B and 9C. Similarly, when a function $P_F(R,P)$ analogous to that shown in FIG. 8B and 7B (taking into account the inversion of rotation and feeding speed) is applied by the function generator 440 in the variation of the fourth embodiment shown in FIG. 9A, the feed speed and rotation speed vary as shown in FIGS. 9D and 9E.

Figure 10A:
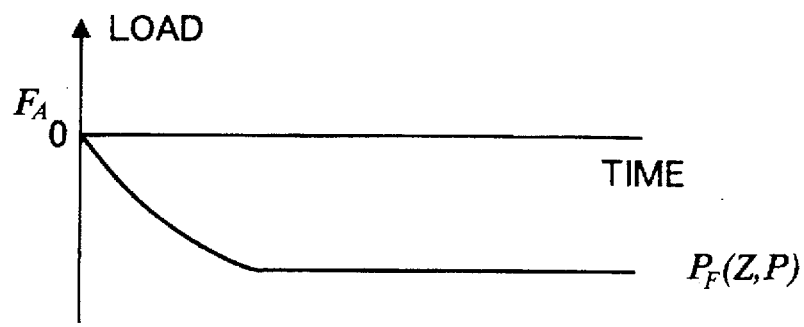
FIG. 10A shows a waveform of the change of a load $F_A$ for the fourth embodiment.
Figure 10B:
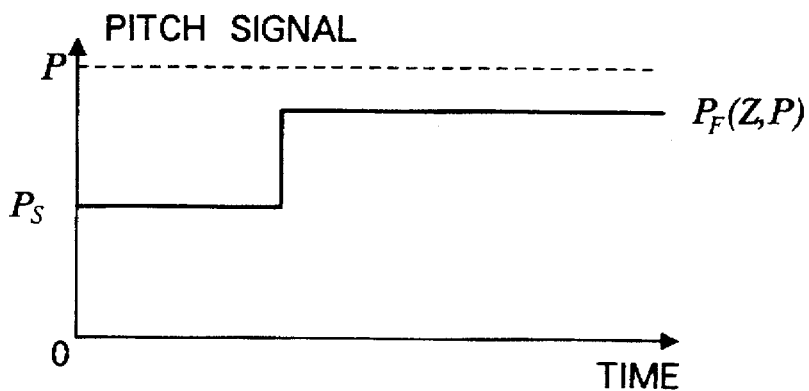
FIG. 10B shows a waveform of the change of a function $P_F(Z,P)$ for the fourth embodiment.
Figure 10C:
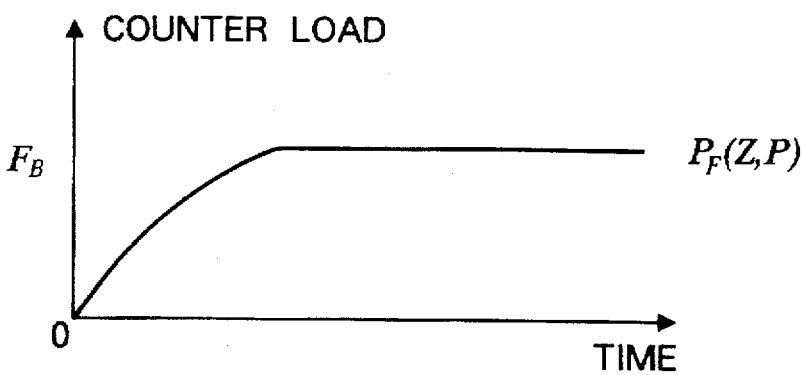
FIG. 10C shows a waveform of the change of a load $F_B$ for the fourth embodiment.
Figure 10D:
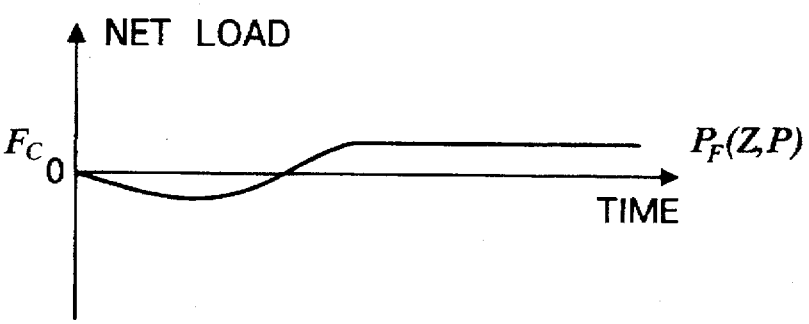
FIG. 10D shows a waveform of the change of a net load $F_C$ (=$F_A$+$F_B$) for the fourth embodiment.

FIG. 10B shows yet another function $P_F(Z,P)$ that the function generator 40 can apply. The function shown in FIG. 10B is a step function applied to reduce the net load $F_C$. FIG. 10A shows the force $F_A$ generated by uncorrected cutting, FIG. 10C shows the counterload $F_B$ applied by the correction action of the function of FIG. 10B, and FIG. 10D shows the net, corrected load $F_C$ undergone by the tapping tool 15 and the workpiece 17. When the load $F_A$ is as shown in FIG. 10A and the function $P_F(Z,P)$ Of FIG. 10B is chosen at the function generator 40, the counterload $F_B$ is controlled to increase, as shown in FIG. 10C, by the pitch function signal $P_S(Z_i,P)$ generated by the function generator 40. Accordingly, the net load $F_C$ undergone by the tapping tool 15 and the workpiece 17 is kept at a much lower level than the raw axial load $F_A$ shown in FIG. 10D.

Figure 8A:
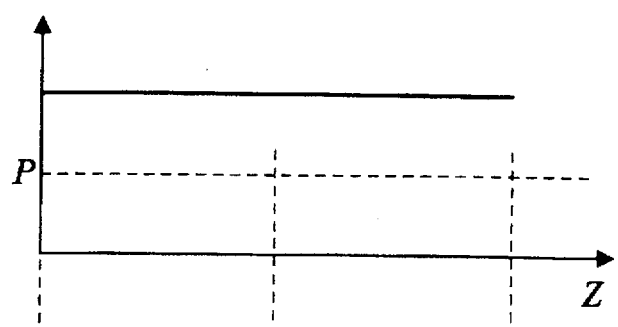
FIG. 8A shows a waveform of an example function $P_F(Z,P)$ having a constant value irrespective of the load.

In another instance, if a constant pitch function $P_F(Z,P)$ similar to that shown in FIG. 8A is used (but with a lower pitch function than the nominal pitch P), the net load can also be reduced. In one numerical example, a rolled tapping tool with a diameter of 20 mm is used. Inputs to the input unit are a nominal feeding pitch of 1.5 mm (for a cutting pitch of 1.5 mm), a threading depth of 20 mm, and a nominal spindle rotation speed of 6000 rpm. By using a constant pitch function similar to that of FIG. 8A with a corrected pitch of 1.495 mm, the net load $F_C$ is reduced by 30% in comparison to a feeding pitch set at 1.5 mm (that is, corresponding to the cutting pitch).

Figure 11:
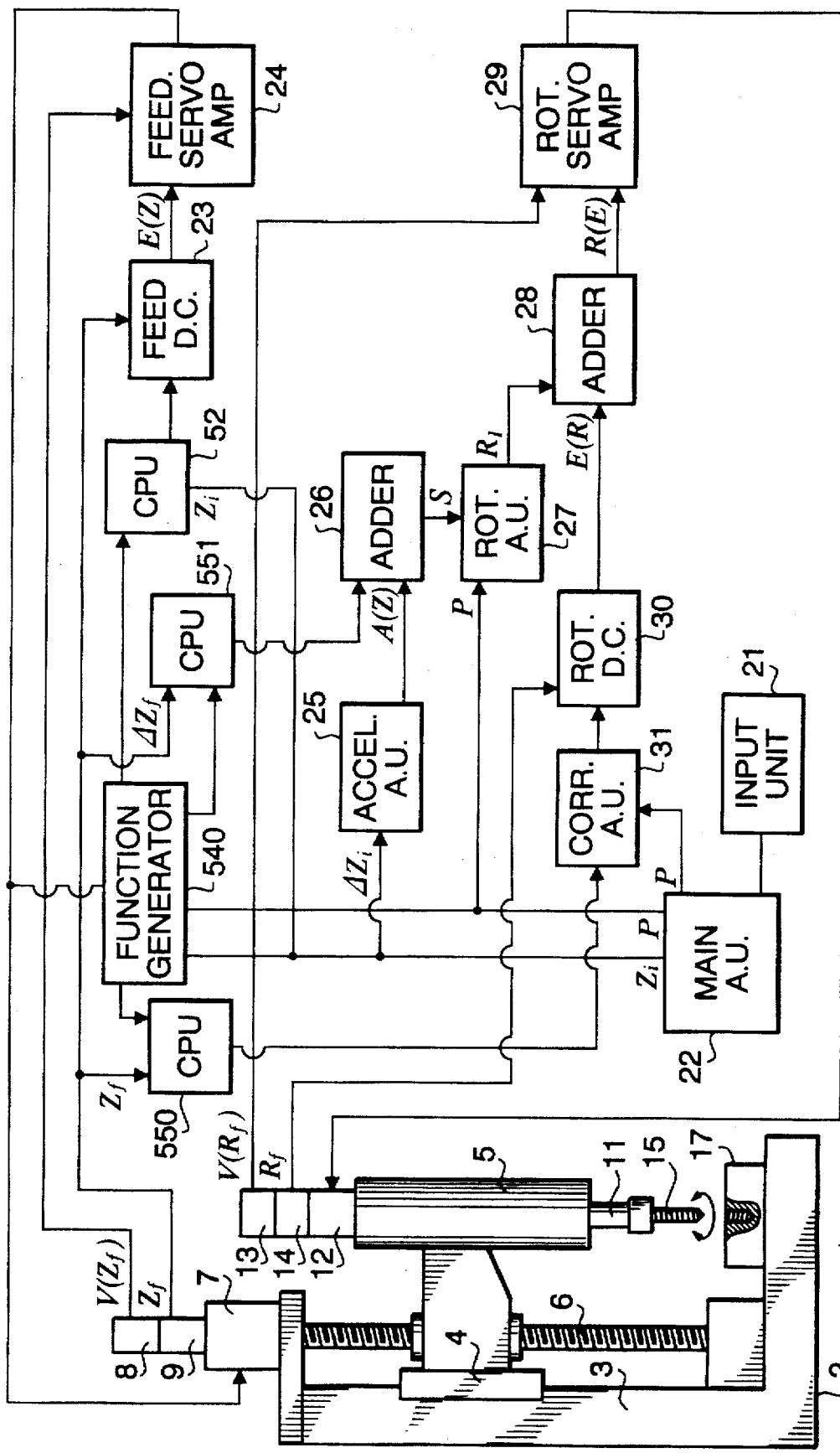
FIG. 11 is a block diagram schematic of a fifth embodiment of a thread cutting machine according to the invention.

A fifth embodiment of a thread cutting machine 105 according to the invention is shown in FIG. 11. As shown in FIG. 11, particular to the fifth embodiment, a function generator 540 is provided for generating a pitch function signal $P_S(Z_i,P)$ according to a pitch function $P_F(Z,P)$, and pulse correction units 550, 551, and 552 are provided for correcting an input pulse and outputting a corrected pulse according to the input function $P_F(Z,P)$. The function generator 540 is similar to that of the fourth embodiment, and is capable of generating at least the previously described functions. Again, the variety of functions that the function generator 540 generates are each determined based on empirical data giving a relationship between known loads for a given pitch, feed speed, feed depth, tool type, and rotation speed.

All three pulse correction units 550, 551, and 552 increase or decrease an input pulse rate according to the input from the function generator 540. Specifically, when the pulse correction unit 652 compensates the feed instruction pulse $Z_i$ to make the feeding speed $V(Z_f)$ match the selected function $P_F(Z,P)$, the pulse correction units 550 and 551 compensate the position feedback pulse $Z_f$ by respective amounts to make the spindle speed $V(R_f)$ match the selected function. The corrections are performed according to the pitch function signal $P_{S(Zi}, P)$, determined by the pitch function $P_F(Z, P)$. For example, when a function $P_F(Z,P)$ similar to that shown in FIG. 7B and 8B is input into the function generator 640, the pulse correction unit 652 outputs a corrected position feed instruction pulse $Z_i$ to the feed deviation counter 23, substantially resulting in the feeding speed profile shown in FIGS. 9B. However, the rotation speed of the spindle 11 is also influenced by the feed instruction pulse $Z_i$. Therefore, if the feeding speed is changed, the rotation speed of the spindle 11 is also changed. Therefore, the pulse correction units 550 and 551 correct the position feedback pulse $Z_f$, substantially resulting in the rotation speed profile shown in FIG. 9C. Again, the counterload $F_B$ is generated, reducing the net load $F_C$, and the force applied to the tapping tool 15 and to the workpiece 17 is reduced.

Figure 12:
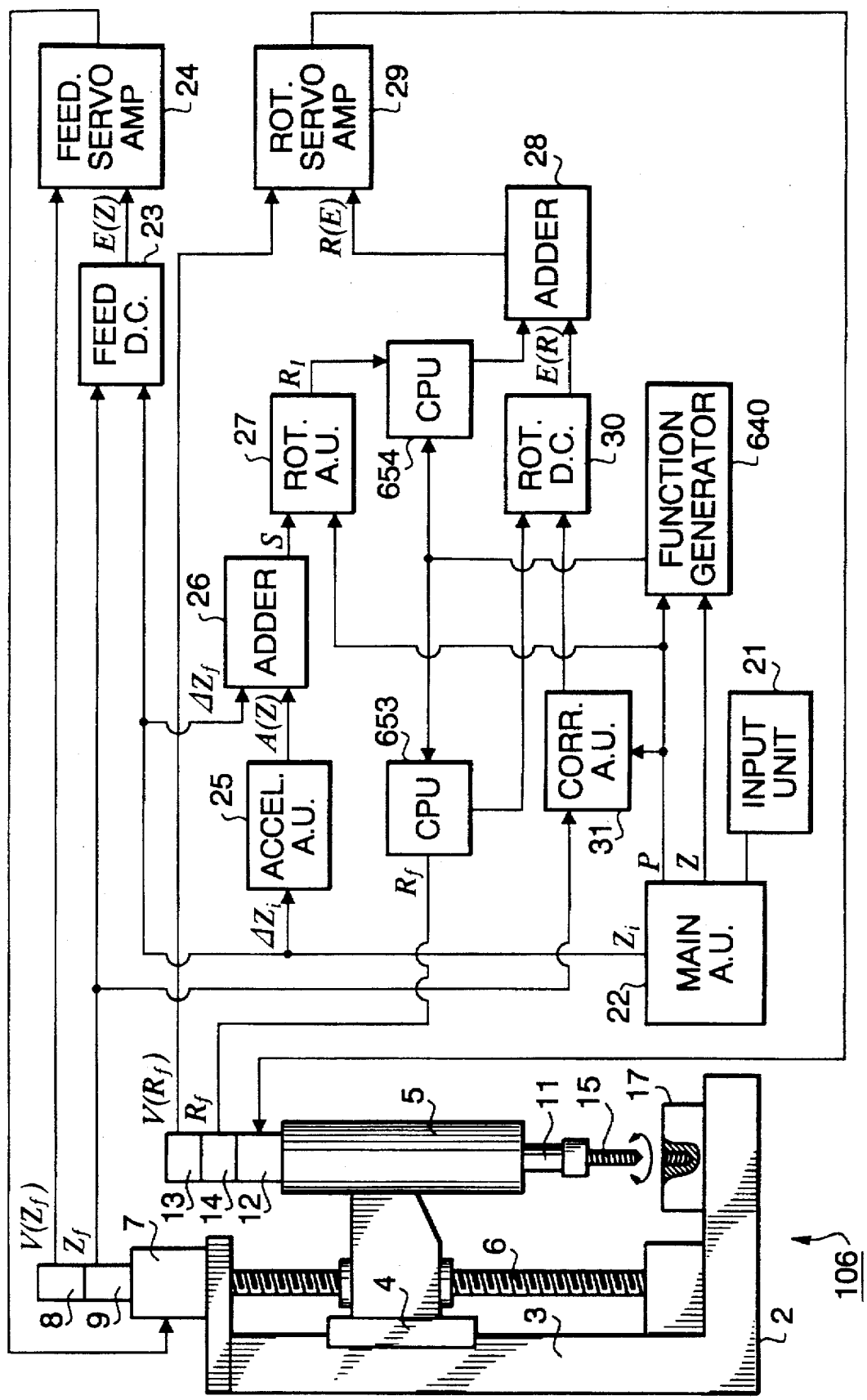
FIG. 12 is a block diagram schematic of a sixth embodiment of a thread cutting machine according to the invention.

A sixth embodiment of a thread cutting machine 106 according to the invention is shown in FIG. 12. As shown in FIG. 12, particular to the sixth embodiment, a function generator 640 is provided for generating a pitch function signal $P_S(Z_i,P)$, and pulse correction units 653 and 654 are provided for correcting an input pulse and outputting a corrected pulse according to the input pitch function signal $P_S(Z_i,P)$. Both pulse correction units 653 and 654 increase or decrease an input pulse rate according to the input from the function generator 640. The function generator 640 is similar to that of the fourth embodiment, and is capable of generating at least the previously described functions. Again, the variety of functions that the function generator 640 generates are each determined based on empirical data giving a relationship between known loads for a given pitch, feed speed, feed depth, tool type, and rotation speed.

The pulse correction unit 654 corrects the rotation instruction signal $R_1$ in order to achieve substantially the rotation speed profile shown in FIG. 9C. However, the rotation deviation counter 30 calculates the rotation deviation E(R) based on the rotation correction value $R(Z_f)$ and the rotation position feedback signal $R_f$. Thus, in the absence of the pulse correction unit 653, if the rotation speed is, for example, increased, then the rotation deviation E(R) is also increased. Therefore, in order to compensate the rotation deviation function E(R), the pulse correction unit 653 corrects the rotation position feedback pulse $R_f$, while the pulse correction unit 654 changes the rotation instruction signal $R_1$. These two compensations substantially result in the rotation speed profile shown in FIG. 9C. Consequently, the counterload $F_B$ is generated, reducing the net load $F_C$.

Figure 13:
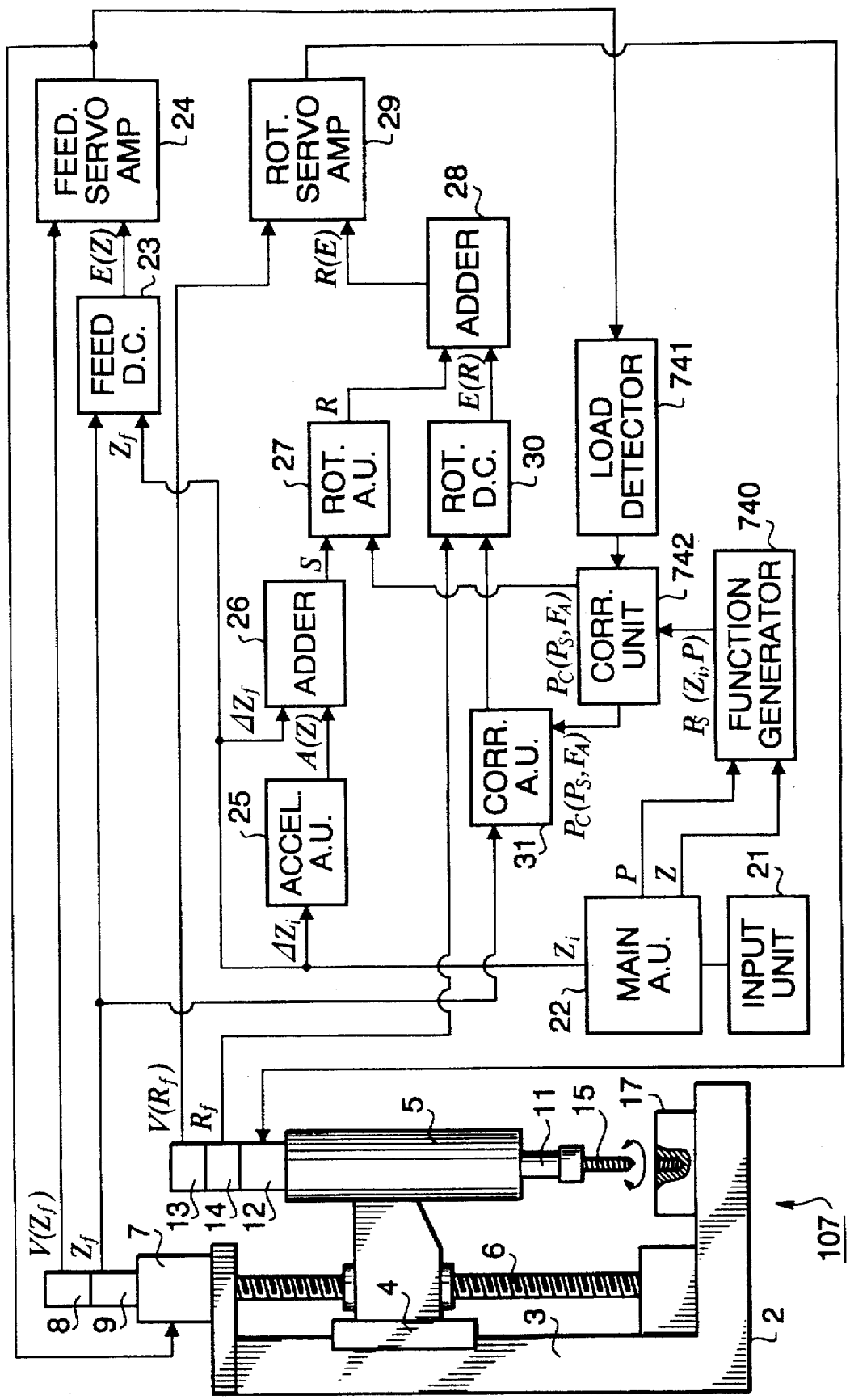
FIG. 13 is a block diagram schematic of a seventh embodiment of a thread cutting machine according to the invention.

A seventh embodiment of a thread cutting machine 107 according to the invention is shown in FIG. 13. As shown in FIG. 13, particular to the seventh embodiment, a function generator 740 is provided for generating a pitch function signal $P_S(Z_i,P)$, a load detector 741 is provided for sensing the axial load from the load on the feed servo amplifier 24, and a correction unit 742 is provided for correcting the pitch function signal $P_S(Z_i,P)$ from the function generator 740 according to the load detected by the correction unit 742. The load detector 741 is similar to that in the first through third embodiments, and the correction unit 742 is similar to that in the first embodiment. Again, an appropriately placed strain gage sensor may be used instead of the output of the feed servo amp 24. The function generator 740 is similar to that of the fourth embodiment, and is capable of generating at least the previously described functions. Again, the variety of functions that the function generator 740 generates are each determined based on empirical data giving a relationship between known loads for a given pitch, feed speed, feed depth, tool type, and rotation speed.

The correction unit 742 changes the pitch function signal $P_S(Z_i,P)$ output from the function generator 740 in response to the load detected by the load detector 741. Specifically, in this case, the correction unit 742 decreases the function (pitch) signal $P_S(Z_i,P)$ from the function generator 740 when an increased load $F_A$ (a downward load on the workpiece 17) is detected, and increases the pitch function signal $P_S(Z_i,P)$ from the function generator 740 when an decreased load $F_A$ (a upward load on the workpiece 17) is detected.

The value of the load $F_A$ is characteristically unstable. Specifically, tool wear contributes most significantly to the instability of the load $F_A$. The empirically determined functions described previously and applied in the fourth through sixth embodiment do not necessarily account for tool wear. Therefore, the seventh embodiment uses the load detector 741 to stabilize the correction.

FIGS. 14A through 14D show how the use of the function generator 540, the load detector 741, and the correction unit 742 are able to compensate for wear. In these figures, comparisons are drawn between the uncorrected function $P_F(Z,P)$, and a corrected function $P_C(P_F,F_A)$ representative of the changes made by the correction unit 742. In actuality, the correction is performed on the pitch function signal $P_S(Z_i,P)$.

Figure 14A:
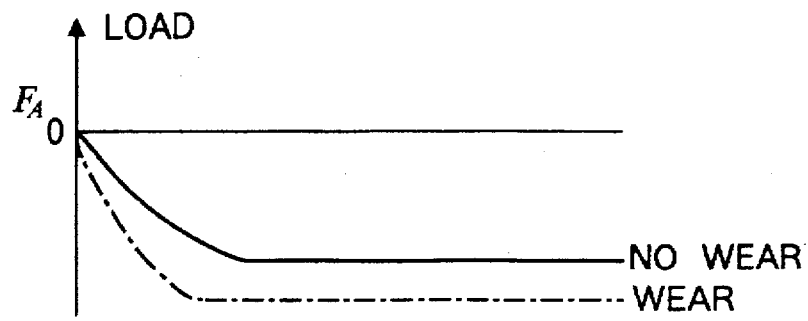
FIG. 14A shows a waveform of the change of a load $F_A$ for the seventh embodiment, showing the effect of wear.

FIG. 14A shows two examples of load progressions of the axial load $F_A$. The solid line is in the case of no wear (that is, the same as FIG. 10A), while the single-dotted line shows the same tapping operation with a worn tool.

Figure 14B:
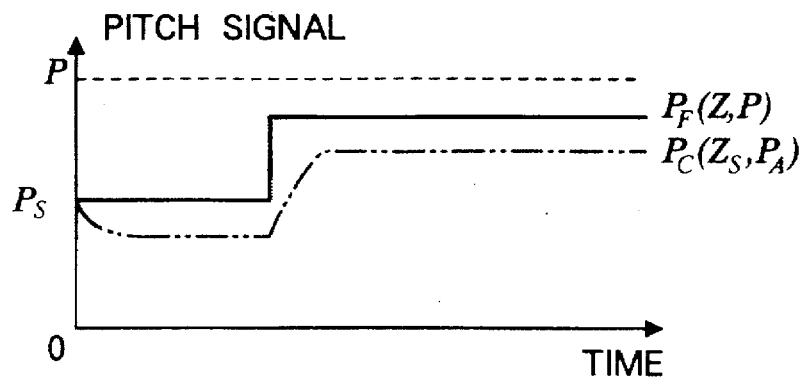
FIG. 14B shows a waveform of the change of a function $P_F(Z,P)$ and corrected function $P_C(P_F,F_A)$ for the seventh embodiment.

FIG. 14B shows an example uncorrected function $P_F(Z,P)$ that the function generator 740 can apply, and the effect on the function of the correction unit 742. That is, the solid line is an uncorrected pitch function $P_F(Z,P)$, and the double-dotted line is the corrected pitch function $P_C(P_F,P_A)$. In this case, the uncorrected pitch function $P_F(Z,P)$ is the same as FIG. 10B, a step function.

Figure 14C:
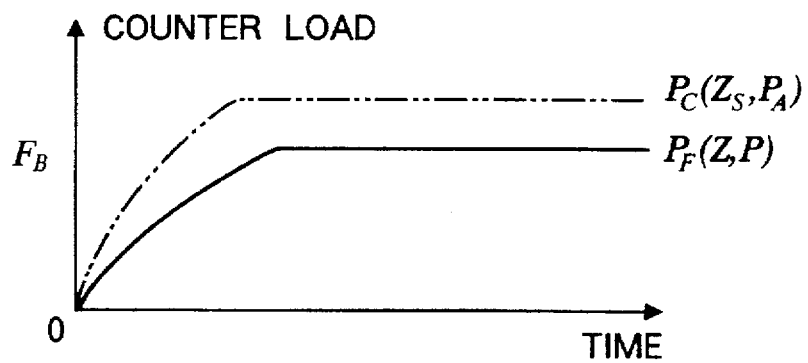
FIG. 14C shows a waveform of the change of a counterload $F_B$ for the seventh embodiment.

FIG. 14C shows the counterloads $F_B$ applied by the functions of FIG. 14B. That is, the solid line shows the counterload $F_B$ applied by the uncorrected function $P_F(Z,P)$, while the double-dotted line shows the counterload $F_B$ applied by the corrected function $P_C(P_F,P_A)$. In this case, counterload $F_B$ applied by the uncorrected function $P_F(Z,P)$ is the same as FIG. 10C.

Figure 14D:
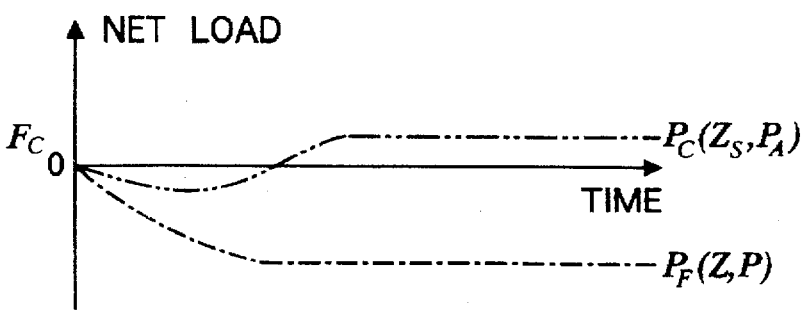
FIG. 14D shows a waveform of the change of a net load $F_C$ (=$F_A$+$F_B$) for the seventh embodiment.

Lastly, FIG. 14D shows the net, corrected load $F_C$ undergone by the worn tapping tool 15 and the workpiece 17 under the corrected function $P_C(P_F,P_A)$, in comparison to an uncorrected function $P_F(Z,P)$ with a worn tool. That is, the single dotted line is the net load $F_C$ undergone with a worn tool when the uncorrected function $P_F(Z,P)$ is applied, while the double dotted line shows the net load $F_C$ undergone with a worn tool when the corrected function signal $P_C(P_F,F_A)$ is applied.

Thus, when the axial load $F_A$ with a worn tool is as shown in FIG. 14A by a single-dotted line, the corrected function $P_C(P_F, P_A)$ shown by a double-dotted line in FIG. 14B is applied by the combination of function generator 740, correction unit 742, and load detector 741. Accordingly, in this example, the counterload $F_B$ is controlled to increase by the influence of the function generator 740, correction unit 742, and load detector 741, as shown in FIG. 14C by a double-dotted line. Accordingly, the net load $F_C$ undergone by the tapping tool 15 and the workpiece 17 is kept at a much lower level than the axial load $F_A$ shown by the double dotted line in FIG. 14D. Furthermore, the net load $F_C$ undergone by the tapping tool 15 and the workpiece 17 is kept at a lower level than an uncorrected function $P_F(Z,P)$ with a worn tool, as shown by the comparison between the double-dotted line (corrected function) and single-dotted line (uncorrected function) in FIG. 14D.

Consequently, with the seventh embodiment of a thread cutting machine according to the invention, when the load $F_A$ is changed by the wear of the tapping tool 15, causing the counterload $F_B$ generated by an empirically established function $P_F(Z,P)$ to stray from desired results, the correction $P_S(Z_i,P)$ to represent a corrected function $P_C(P_F,P_A)$, thus changing the counterload $F_B$ to meet the change in the load $F_A$.

Thus, each of the embodiments generates a counterload $F_B$ in an opposite direction to the axial load $F_A$, to reduce the net load $F_C$ on the workpiece 17 and on the tapping tool 15 itself. However, in generating the counterload $F_B$, each application maintains the cutting pitch; that is, the thread pitch of the tapping tool 15. In the various embodiments, the counterload $F_B$ is generated by changing a feeding pitch P to a corrected feeding pitch P1, which changes the rotation speed, while keeping the feeding speed constant; by changing the feeding speed, while compensating the rotation speed (which is derived from the feeding speed) to remain constant; by changing the rotation speed, while compensating the rotation speed deviation feedback (to allow the deviation correction to follow the rotation speed change), while keeping the feeding speed constant; by generating a function according to empirical results that controls the feeding pitch, and therefore the rotation speed, while keeping the feeding speed constant; and by combinations of these methods.

However, in generating the counterload $F_B$, each embodiment maintains the cutting pitch; that is, the thread pitch of the tapping tool 15. Therefore, the net load $F_C$ on the workpiece 17 and on the tapping tool 15 is reduced, although the threads are properly cut. Furthermore, each embodiment both precisely controls the feed speed and the rotation speed of the spindle by detecting Z-movement of the spindle, and computes rotation control data according to the axial feed speed and acceleration of the spindle, allowing high speed, precise cutting of threads.

What is claimed is:

1. A thread cutting apparatus, comprising:

a rotatable spindle;

a tapping tool attached to said rotatable spindle, said tapping tool having a cutting pitch at which threads are cut in a workpiece;

a servo drive system for driving an axial feeding speed, rotating speed, and axial feeding position of said tapping tool relative to said workpiece;

a load detecting system for detecting an axial load on said tapping tool based on an output of an amplifier of said servo drive system when said tapping tool taps said workpiece; and a correcting system for correcting at least one of the rotating speed, feeding speed, or feeding pitch according to said detected axial load to reduce said axial load while maintaining said cutting pitch.

2. The thread cutting apparatus according to claim 1, wherein said servo drive system comprises:

rotating means for relatively rotating said tapping tool and said workpiece at a predetermined rotating speed;

feeding means for relatively axially feeding said tapping tool and the workpiece at a predetermined feeding speed related to said rotating speed by a feeding pitch; and an input unit for inputting said feeding pitch;

wherein said correcting system corrects said at least one of the rotating speed, feeding speed, or feeding pitch according to a predetermined relationship between said feeding pitch and said axial load.

3. The thread cutting apparatus according to claim 2, wherein said rotating means relatively rotates said tapping tool and a workpiece at a rotating speed equal to the feeding speed divided by the feeding pitch, and wherein said correcting system changes said feeding pitch according to said detected axial load to change said rotation speed in a direction to decrease said axial load.

4. The thread cutting apparatus according to claim 2, wherein said correction system comprises:

instruction means for sending a feeding speed instruction;

feeding control means for setting a feeding speed of said tapping tool according to said feeding speed instruction;

conversion means for converting said feeding speed instruction, according to a predetermined ratio, to a rotation speed instruction, rotation control means for setting a rotation speed of said tapping tool according to said rotation speed instruction;

feedback means for correcting rotation speed when a feeding feedback signal, taken from detected feeding speed, deviates from said feeding speed instruction;

means for changing said feeding speed away from said feeding speed instruction; and means for compensating said feeding feedback signal, in response to said means for changing, to maintain said rotation speed uncorrected even when said detected feeding speed is changed from said feeding speed instruction.

5. The thread cutting apparatus according to claim 2, wherein said correction system comprises:

instruction means for sending a feeding instruction;

feeding control means for feeding said tapping tool according to said feeding instruction;

conversion means for converting said feeding instruction according to a predetermined ratio to a rotation instruction, rotation control means for rotating said tapping tool according to said rotation instruction;

feedback means for correcting rotation deviation from said rotation instruction according to a rotation feedback signal representing detected rotation;

means for changing said rotation away from said rotation instruction; and means for compensating said rotation feedback signal, in response to said means for changing, to allow said changing of rotation even when said rotation deviates from said rotation instruction.

6. A thread cutting apparatus, comprising:

a rotatable spindle;

a tapping tool attached to said rotatable spindle, said tapping tool having a cutting pitch at which threads are cut in a workpiece;

control means for controlling an axial feeding speed, rotating speed, and axial feeding position of said tapping tool relative to said workpiece; and means for generating a counterload in an opposite direction to an axial load on said workpiece while maintaining said cutting pitch during thread cutting of said workpiece;

wherein said control means comprises:

rotating means for relatively rotating said tapping tool and the workpiece at a predetermined rotating speed;

feeding means for relatively axially feeding said tapping tool and the workpiece at a predetermined feeding speed related to said rotating speed by a feeding pitch; and an input unit for inputting said feeding pitch;

wherein said means for generating a counterload comprises:

a function generator for generating a feeding pitch function according to said feeding pitch;

wherein said feeding speed and said rotating speed are determined according to a relationship with said feeding pitch function to change said axial load while maintaining said cutting pitch;

and wherein said means for generating a counterload generates said counterload according to a predetermined relationship between said feeding pitch and said axial load.

7. The thread cutting apparatus according to claim 6, wherein said function generator generates a plurality of functions.

8. The thread cutting apparatus according to claim 6, further comprising:

load detecting means for detecting an axial load on said feeding means when said tapping tool taps said workpiece; and correcting means for correcting said feeding speed according to said detected axial load to reduce said axial load while maintaining said cutting pitch.

9. A thread cutting apparatus, comprising:

a spindle equipped with a tapping tool having a cutting pitch at which threads are tapped;

control means to which a feeding pitch corresponding to said cutting pitch is input;

rotating means for relatively rotating said tapping tool and a workpiece at a rotating speed;

a servo feeding system for relatively axially feeding said tapping tool and the workpiece at a feeding speed related to said rotating speed and said input feeding pitch;

a load detecting system for detecting an axial load on said tapping tool based on an output of an amplifier of said servo drive system when said tapping tool taps said workpiece; and correcting means for correcting at least one of the rotating speed, feeding speed, or feeding pitch according to said detected axial load to reduce said axial load while maintaining said cutting pitch.

10. The thread cutting apparatus according to claim 9, wherein said rotating means relatively rotates said tapping tool and a workpiece at a rotating speed equal to the feeding speed divided by the feeding pitch, and wherein said correcting means changes said feeding pitch according to said detected axial load to change said rotation speed in a direction to decrease said axial load.

11. The thread cutting apparatus according to claim 9, wherein said correcting means generates a counterload in an opposite direction to said axial load, to decrease said axial load, while maintaining said cutting pitch.

12. The thread cutting apparatus according to claim 9, wherein said correction means comprises:

instruction means for sending a feeding speed instruction;

feeding control means for setting a feeding speed of said tapping tool according to said feeding speed instruction;

conversion means for converting said feeding speed instruction according to a predetermined ratio to a rotation speed instruction, rotation control means for setting a rotation speed of said tapping tool according to said rotation speed instruction;

feedback means for correcting rotation speed when a feeding feedback signal, taken from detected feeding speed, deviates from said feeding speed instruction;

means for changing said feeding speed away from said feeding speed instruction; and means for compensating said feeding feedback signal, in response to said means for changing, to maintain said rotation speed uncorrected even when said detected feeding speed is changed from said feeding speed instruction.

13. The thread cutting apparatus according to claim 9, wherein said correction means comprises:

instruction means for sending a feeding instruction;

feeding control means for feeding said tapping tool according to said feeding instruction;

conversion means for converting said feeding instruction according to a predetermined ratio to a rotation instruction, rotation control means for rotating said tapping tool according to said rotation instruction;

feedback means for correcting rotation deviation from said rotation instruction according to a rotation feedback signal representing detected rotation;

means for changing said rotation away from said rotation instruction; and means for compensating said rotation feedback signal, in response to said means for changing, to allow said changing of rotation even when said rotation deviates from said rotation instruction.

14. A thread cutting apparatus, comprising:

a rotatable spindle having a tapping tool attached, said tapping tool being axially feedable and rotatable;

instruction means for sending a feeding speed instruction;

feeding control means for setting a feeding speed of said tapping tool according to said feeding speed instruction;

conversion means for converting said feeding speed instruction according to a predetermined ratio to a rotation speed instruction, rotation control means for setting a rotation speed of said tapping tool according to said rotation speed instruction;

feedback means for correcting rotation speed when a feeding feedback signal, taken from detected feeding speed, deviates from said feeding speed instruction;

means for changing said feeding speed away from said feeding speed instruction; and means for compensating said feeding feedback signal, in response to said means for changing, to maintain said rotation speed uncorrected even when said detected feeding speed is changed from said feeding speed instruction.

15. The thread cutting apparatus according to claim 14, wherein said instruction means comprises:

a function generator for generating a feeding pitch function according to said feeding pitch, and wherein said feeding speed instruction comprises said feeding pitch function, and said feeding speed is determined according said feeding pitch function.

16. The thread cutting apparatus according to claim 15, wherein said function generator generates a plurality of functions.

17. A thread cutting apparatus, comprising:

a rotatable spindle having a tapping tool attached, said tapping tool being axially feedable and rotatable;

instruction means for sending a feeding instruction;

feeding control means for feeding said tapping tool according to said feeding instruction;

conversion means for converting said feeding instruction according to a predetermined ratio to a rotation instruction, rotation control means for rotating said tapping tool according to said rotation instruction;

feedback means for correcting rotation deviation from said rotation instruction according to a rotation feedback signal representing detected rotation;

means for changing said rotation away from said rotation instruction; and means for compensating said rotation feedback signal, in response to said means for changing, to allow said changing of rotation even when said rotation deviates from said rotation instruction.

18. The thread cutting apparatus according to claim 17, wherein said instruction means comprises:

a function generator for generating a feeding pitch function according to said feeding pitch, and wherein said feeding instruction comprises said feeding pitch function, and said feeding is determined according to said feeding pitch function.

19. The thread cutting apparatus according to claim 18, wherein said function generator generates a plurality of functions.

20. A thread cutting apparatus, comprising:

a spindle equipped with a tapping tool having a cutting pitch at which threads are tapped;

control means to which a feeding pitch corresponding to said cutting pitch is input;

rotating means for relatively rotating said tapping tool and a workpiece at a rotating speed;

feeding means for relatively axially feeding said tapping tool and the workpiece at a feeding speed; and a function generator for generating a feeding pitch function according to said feeding pitch;

wherein said feeding speed and said rotating speed are determined according to a relationship with said feeding pitch function to change said axial load while maintaining said cutting pitch.

21. The thread cutting apparatus according to claim 20, wherein said function generator generates a plurality of functions.

22. The thread cutting apparatus according to claim 20, wherein said function generator comprises means for generating a counterload in an opposite direction to said axial load while maintaining said cutting pitch.

23. The thread cutting apparatus according to claim 20, further comprising:

instruction means for sending said feeding pitch function as a feeding speed instruction;

feeding control means for setting a feeding speed of said tapping tool according to said feeding speed instruction;

conversion means for converting said feeding speed instruction according to a predetermined ratio to a rotation speed instruction;

rotation control means for setting a rotation speed of said tapping tool according to said rotation speed instruction;

feedback means for correcting rotation speed when a feeding feedback signal, taken from detected feeding speed, deviates from said feeding speed instruction;

means for changing said feeding speed away from said feeding speed instruction; and means for compensating said feeding feedback signal, in response to said means for changing, to maintain said rotation speed uncorrected even when said detected feeding speed is changed from said feeding speed instruction.

24. The thread cutting apparatus according to claim 20, further comprising:

instruction means for sending said feeding pitch function as a feeding instruction;

feeding control means for feeding said tapping tool according to said feeding instruction;

conversion means for converting said feeding instruction according to a predetermined ratio to a rotation instruction;

rotation control means for rotating said tapping tool according to said rotation instruction;

feedback means for correcting rotation deviation from said rotation instruction according to a rotation feedback signal representing detected rotation;

means for changing said rotation away from said rotation instruction; and means for compensating said rotation feedback signal, in response to said means for changing, to allow said changing of rotation even when said rotation deviates from said rotation instruction.

25. A thread cutting apparatus, comprising:

a spindle equipped with a tapping tool having a cutting pitch at which threads are tapped;

control means to which a feeding pitch corresponding to said cutting pitch is input;

rotating means for relatively rotating said tapping tool and a workpiece at a rotating speed;

feeding means for relatively axially feeding said tapping tool and the workpiece at a feeding speed;

a feeding position detector for detecting a relative feeding position of said workpiece with respect to said tapping tool; and a function generator for generating a feeding pitch function according to said relative feeding position;

wherein said feeding speed and said rotating speed are determined according to said feeding pitch function to change said axial load at differing relative feeding positions while maintaining said cutting pitch.

26. The thread cutting apparatus according to claim 25, wherein said function generator generates a plurality of functions.

27. The thread cutting apparatus according to claim 25, wherein said function generator comprises means for generating a counterload in an opposite direction to said axial load while maintaining said cutting pitch.

28. The thread cutting apparatus according to claim 25, further comprising:

instruction means for sending said feeding pitch function as a feeding speed instruction;

feeding control means for setting a feeding speed of said tapping tool according to said feeding speed instruction;

conversion means for converting said feeding speed instruction according to a predetermined ratio to a rotation speed instruction;

rotation control means for setting a rotation speed of said tapping tool according to said rotation speed instruction;

feedback means for correcting rotation speed when a feeding feedback signal, taken from detected feeding speed, deviates from said feeding speed instruction;

means for changing said feeding speed away from said feeding speed instruction; and means for compensating said feeding feedback signal, in response to said means for changing, to maintain said rotation speed uncorrected even when said detected feeding speed is changed from said feeding speed instruction.

29. The thread cutting apparatus according to claim 25, further comprising:

instruction means for sending said feeding pitch function as a feeding instruction;

feeding control means for feeding said tapping tool according to said feeding instruction;

conversion means for converting said feeding instruction according to a predetermined ratio to a rotation instruction;

rotation control means for rotating said tapping tool according to said rotation instruction;

feedback means for correcting rotation deviation from said rotation instruction according to a rotation feedback signal representing detected rotation;

means for changing said rotation away from said rotation instruction; and means for compensating said rotation feedback signal, in response to said means for changing, to allow said changing of rotation even when said rotation deviates from said rotation instruction.

30. A thread cutting method applied in a thread cutting machine having a tapping tool with a cutting pitch, comprising the steps of:

setting a rotation speed of a tapping tool to a feeding speed divided by a feeding pitch;

detecting an axial load on said tapping tool when said tapping tool cuts threads in a workpiece; and generating a counterload in a direction opposite to said axial load while maintaining said cutting pitch.

31. The thread cutting method of claim 30, further comprising the step of:

changing said feeding pitch and thereby said rotation speed to generate said counterload while keeping said feeding speed constant.

32. The thread cutting method of claim 30, further comprising the steps of:

changing said feeding speed to generate said counterload; and compensating said rotation speed to keep said rotation speed constant.

33. A thread cutting method applied in a thread cutting machine having a tapping tool with a cutting pitch, comprising the steps of:

generating a feeding pitch function defining a predetermined feeding pitch for any feeding position;

setting a rotation speed of a tapping tool to a feeding speed divided by said feeding pitch function; and cutting threads in a workpiece according to said feeding pitch function.

34. The thread cutting method according to claim 33, further comprising the step of:

changing said feeding pitch and thereby said rotation speed to generate a counterload while keeping said feeding speed constant.

35. The thread cutting method according to claim 33, further comprising the steps of:

changing said feeding speed to generate a counterload; and compensating said rotation speed to keep said rotation speed constant.

* * * * *